United States Patent
Uchida et al.

(10) Patent No.: US 7,742,230 B2
(45) Date of Patent: Jun. 22, 2010

(54) PROJECTION DISPLAY-USE SCREEN AND PROJECTION DISPLAY SYSTEM OPTICAL SYSTEM

(75) Inventors: Tatsuo Uchida, 1-11, Takasago 2-chome, Miyagino-ku, Sendai-shi Miyagi 9830014 (JP); Baku Katagiri, Sendai (JP); Toru Kawakami, Sendai (JP); Takahiro Ishinabe, Sendai (JP)

(73) Assignee: Tatsuo Uchida, Sendai-Shi (JP)

( * ) Notice: Subject to any disclaimer, the term of this patent is extended or adjusted under 35 U.S.C. 154(b) by 944 days.

(21) Appl. No.: 10/583,713

(22) PCT Filed: Sep. 13, 2005

(86) PCT No.: PCT/JP2005/016813

§ 371 (c)(1),
(2), (4) Date: Jul. 21, 2006

(87) PCT Pub. No.: WO2006/030765

PCT Pub. Date: Mar. 23, 2006

(65) Prior Publication Data

US 2007/0110380 A1    May 17, 2007

(30) Foreign Application Priority Data

Sep. 14, 2004  (JP) ............................. 2004-267170
Dec. 13, 2004  (JP) ............................. 2004-359623

(51) Int. Cl.
G03B 21/56    (2006.01)
G03B 21/60    (2006.01)

(52) U.S. Cl. .................... 359/443; 359/459; 359/460; 385/116

(58) Field of Classification Search ................. 385/116, 385/120; 359/443, 454, 459, 460
See application file for complete search history.

(56) References Cited

U.S. PATENT DOCUMENTS

| | | | | |
|---|---|---|---|---|
| 3,043,910 | A * | 7/1962 | Hicks, Jr. | ..................... 348/804 |
| 6,317,545 | B1 * | 11/2001 | Veligdan | ..................... 385/120 |
| 6,751,019 | B2 * | 6/2004 | DeSanto et al. | ............. 359/460 |
| 2006/0098280 | A1 * | 5/2006 | Yamauchi | ................... 359/454 |

\* cited by examiner

*Primary Examiner*—Christopher Mahoney
(74) *Attorney, Agent, or Firm*—Young & Thompson

(57) ABSTRACT

To realize a diffusion film in which arbitrary control of the diffuse light intensity distribution characteristics, and an angular range of diffusion does not change with respect to an incoming light from a specific angular range and a light-outgoing direction converting element that is high in efficiency of conversion of the outgoing direction, and has no limit in the angle of conversion of the outgoing direction, and to provide a thin-model high-quality projection display using the same as a screen.

21 Claims, 31 Drawing Sheets

(a)

(b)

(c)

(a)

(b)

(a)

(b)

(a)

(b)

PROJECTION DISPLAY-USE SCREEN AND PROJECTION DISPLAY SYSTEM OPTICAL SYSTEM

TECHNICAL FIELD

The present invention relates to a projection display screen and, more specifically, to a projection display screen which is easy to manufacture, is low in manufacturing cost, and has high-quality image display characteristics. The present invention also relates to a screen and an optical system for projection display system using a film with a function of converting light-outgoing direction.

BACKGROUND ART

As a technology of the projection display screen in the related art, there exists a rear projection display screen including a diffusion film (for example, see Document 1, Okita et. al, Sumitomo Kagaku 1991-I, p. 37-48) for diffusing incident light from a specific angular range into a specific angular range (for example, see WO2004/034145).

This screen is different from a screen including a Fresnel lens, a lenticular lens, and a diffusion film used generally in the related art, and has very effective advantages such that the structure is simple and the cost can be reduced easily because it includes only the diffusion film for diffusing the incident light from the specific angular range into the specific angular range as shown in FIG. 10, and that a diffuse light intensity distribution characteristics are substantially uniform for the incident light from the specific angular range as shown in FIG. 11 and hence variations in brightness in a screen is low.

On the other hand, in order to reduce the thickness of an optical system for a rear projection display system, as shown in FIG. 31 for example, it is necessary to arrange a projector 20 not on a screen optical axis 10A, but at a position shifted from the screen optical axis 10A to cause a projector light to enter into a screen 10 from an oblique direction. In general, most part of the projector light entered into the screen 10 from the oblique direction does not diffuse in the front direction of the screen where an observer exists, but strongly in the direction of straight-ahead transmission of the projector light. Therefore, in order to achieve the thickness reduction, it is very important to convert the out-going direction of the projector light incoming into the screen from the oblique direction into the front direction.

In order to achieve the conversion of direction of the projector light as described above, as shown in FIG. 32 for example, a technology to cause the projector light 20A incoming from the oblique direction to pass through a prism 30 to convert the outgoing direction by the use of one or both of refraction 40 and total reflection 50 at an interface of the prism is known in the related art (for example, see Document 3, Shikama, S. et. al., SID'02 Digest, p. 1250-1253)

DISCLOSURE OF INVENTION

Problems to be Solved by the Present Invention

In the projection display screen, it is very important that the diffuse light intensity distribution characteristics can be arbitrarily controlled. A diffusing model by diffraction of the incident light is proposed as regards a principle of the diffusion film which plays an important role for realizing the characteristics in the above-described screen (see Document 1). However, the diffuse light intensity distribution characteristics cannot be described clearly by using the model, and hence the arbitrary control of the diffuse light intensity distribution characteristics is not realized.

In the case of the screen using the prism as described above (See Document 3), there are problems such that a stray light of the projector light may be generated at the complicated interface of the prism, which may lead to generation of a ghost on an image, and such that an external light is reflected (rearward reflection) to the incident side (the side of the observer) at the interface, which may results in lowering a contrast ratio. Furthermore, there are problems such that corners of the prism are rounded because of machining accuracy which may cause the projector light to diffuse at the corners of the prism and hence the efficiency of conversion of the outgoing direction is lowered, thereby resulting in lowering of efficiency of usage of the projector light, and such that there exists a limit in angle of conversion of the outgoing direction substantially because the efficiency of conversion of the outgoing direction depends on the incident angle since the projector light falls mainly on the corners of the prism in the case of oblique incidence.

In this case, the efficiency of conversion of the outgoing direction (or the efficiency of conversion of the light-outgoing direction) represents a ratio in light-strength between a light incoming into the light-outgoing direction conversion film from a certain angle or angular range and a light outgoing at a certain angle or angular range, and the angles or angular ranges of incident light and outgoing light are generally determined by the incident angle of the projector light and the screen diffusion characteristics. The angle of conversion of the outgoing direction is an absolute value of a difference between the direction of straight-ahead transmission and the outgoing direction from the light-outgoing direction converting element.

Accordingly, the object of the present invention is to realize a diffusion film in which the arbitrary control of the diffuse light intensity distribution characteristics is possible, and the diffusing angular range is not varied with respect to an incident light from a specific angular range, and to provide a high-quality projection display system using the same as a screen. Furthermore, it is object of the present invention to realize a light-outgoing direction converting element that does not cause generation of ghost or lowering of contrast ratio of images resulting from the complex interface, is high in efficiency of conversion of the outgoing direction, and has no limit in the angle of conversion of the outgoing direction, and to provide a thin-model high-quality projection display using the same as a screen.

Means for Solving the Problems

After having devoted ourselves to study, in order to solve the above-described problems, the Inventors obtained a structure of a diffusion film in which superior characteristics such as:

1) arbitrary control of the diffuse light intensity distribution characteristics is possible;

2) angular range of diffusion does not vary with respect to the incident light from a specific angular range;

3) blur of the incident light is low;

4) high transmission coefficient and low back scattering are realized; and 5) polarization of the incident light is maintained;

can be realized by using a principle of optical waveguide to cause the direction of propagation of the incident light to be changed in flat plate waveguides laminated in layers in the direction in a plane.

Further, the inventors obtained a structure of a light-outgoing direction converting film in which superior characteristics such as:

6) ghost of an image due to a stray light is not generated;

7) the amount of rearward reflection is small;

8) efficiency of conversion of the light-outgoing direction is high;

9) there is no limit in the angle of conversion of the outgoing direction; and 10) polarization of an incident light is retained;

can be realized by changing the direction of propagation of incident light in a curved optical waveguide laminated in layers in the direction in the plane using a principle of the optical waveguide.

BRIEF DESCRIPTION OF THE DRAWINGS

FIG. 12(a) shows an example of the film (3), (b) shows an example of the film (4), and (c) shows an example of the film (5).

REFERENCE NUMERALS

| | |
|---|---|
| 1 | layer (curved optical waveguide = bent waveguide) |
| $1_A$ | layer (core) |
| $1_B$ | layer (clad) |
| $1_C$ | layer (layer having the distribution of refractive indexes that brings out the light-collecting property in the direction of the layer thickness) |
| 2 | light-outgoing direction converting film |
| $2_x$ | remaining portion (film portion other than optical waveguide) |
| 3 | diffusing film |
| 4, $4_1$, $4_2$, $4_3$, $4_4$, $4_L$ | linear gradient index optical waveguide |
| 5, 6, 7, 8, 15, 16, 17, 18 | light beam |
| 9 | optical film |
| $9_1$, $9_2$ | layer |
| 9A | optical film strip |
| 10 | screen |
| 10A | screen optical axis |
| 11 | light source |
| $11_1$ | incident light |
| $11_2$ | outgoing light |
| 12 | transparent medium |
| 20 | projector (optical engine) |
| 20A | projector light |
| 21 | object (image display panel) |
| 30 | prism |
| 40 | refraction |
| 50 | total reflection |
| 51 | film(1) |
| $51_1$ | layer (core) |
| $51_2$ | layer (clad) |
| 52 | film(2) |
| $52_1$ | layer |
| 53 | film(3) |
| 54 | film(4) |
| $53_1$, $54_1$ | portion having the same structure as film (1) |
| $53_2$, $54_2$ | portion having the same structure as film (2) |
| 55 | film(5) |
| $55_A$ | structure formed by fusing the structure of film(1) and the structure of the film (2) |
| 60 | diffusion film (scattering film) |
| 61 | protective plate |
| 62 | projector |
| M1, M3 | mirror |
| M2 | nonspherical mirror |

BEST MODE FOR CARRYING OUT THE INVENTION

Figure 24:
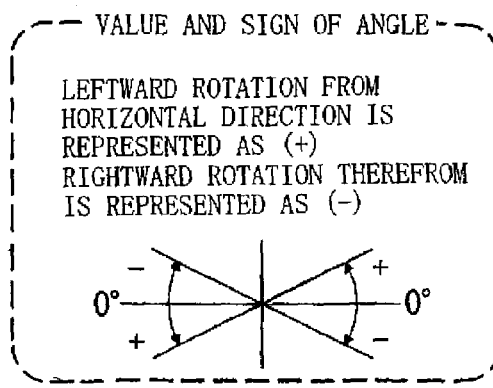
FIG. 24 is an explanatory drawing of a coordinate of signs of angles and directions of rotation.

In the present invention, an angle describing the optical system is, as shown in FIG. 24, such that an angle of a reference direction (for example, a horizontal direction (z-direction)) is 0°, and an angle rotated leftward from the reference direction (counterclockwise) is represented as positive (+), and the angle rotated rightward (clockwise) is represented as negative (−).

Firstly, a diffusion film (film(1)) according to a first embodiment will be described.

Figure 1:
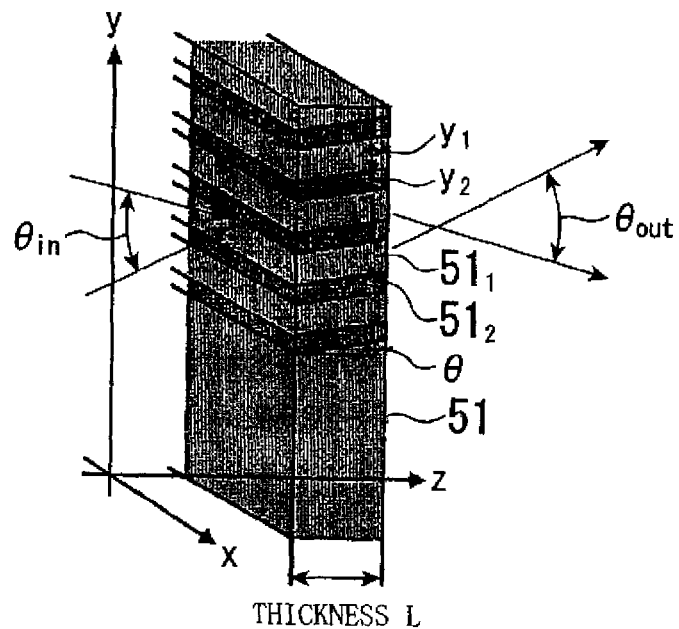
FIG. 1 is a pattern diagram showing an example of a film (1).

FIG. 1 is a pattern diagram showing an example of a film (1). A film (1) 51 can cause light incoming from an angular range of diffusion of the incident light $\theta_{in}$ to be diffused in an angular range of diffusion of the outgoing light $\theta_{out}$. A z-axis extends in the direction parallel to the direction of thickness L of the film (1) 51, and an x-axis and a y-axis orthogonal to each other in a plane perpendicular to the z-axis.

The film (1) 51 has a structure in which layers $51_1$, $51_2$ having different refractive indexes $n_1$, $n_2$ ($n_1 > n_2$) from the adjacent layers form a stripe pattern (widths of the stripes $y_1$, $y_2$) arranged in one direction in a film plane (xy-plane) alternately, and extend in a direction of an averaged inclination angle θ with respect to the direction of the film thickness (z-direction). The conditions of the widths of the stripes $y_1$, $y_2$ of the layers $51_1$, $51_2$ for causing the incident light to be diffused uniformly are represented as follows using the thickness L of the film (1) 51.

$$L \geq 10 \times y_1, L \geq 10 \times y_2$$

Figure 2:
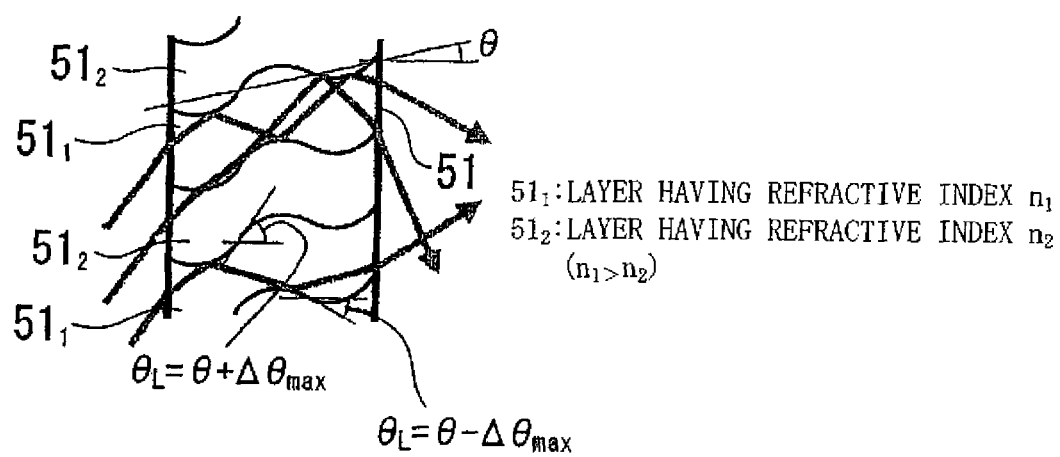
FIG. 2 is a pattern diagrams showing a layer inclination angle of the film (1).

A layer inclination angle $\theta_L$ is defined by an inclination angle of the interface of the layer with respect to the z-axis, and varies within a range from a minimum inclination angle ($\theta - \Delta\theta_{max}$) to a maximum inclination angle ($\theta + \Delta\theta_{max}$) depending on the position in the direction of the thickness of the film (1) 51 as shown in FIG. 2. Here, θ represents the average inclination angle, $\Delta\theta_{max}$ corresponds to ½ of the range of fluctuations of $\theta_L$.

Here, the conditions of the average inclination angle θ for causing the light loss to be eliminated are represented as follows using the refractive index $n_1$.

$$-\sin^{-1}(1/n_1) \leq \theta \leq \sin^{-1}(1/n_1)$$

Figure 3:
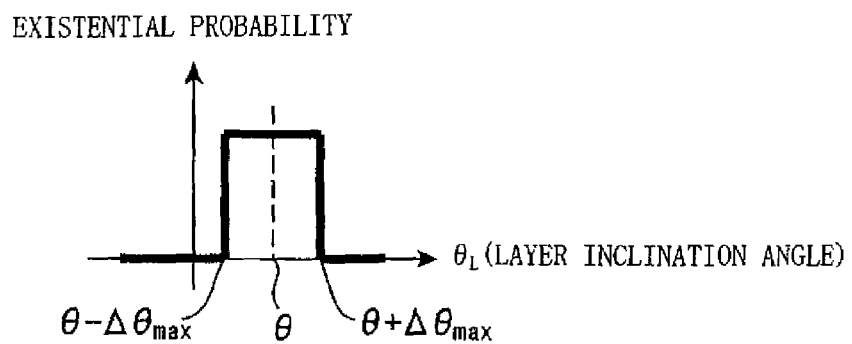
FIG. 3 is a distribution chart showing a state in which the layer inclination angles of the film (1) are uniformly distributed within a predetermined range.

The respective layers in the film (1) 51 having the above-described structure are the same as in the optical waveguides of a step index type. In these layers, the conditions of distribution of the layer inclination angle for causing the incident light to be diffused uniformly is such that the distribution of the existentive probability of the layer inclination angle $\theta_L$ becomes the top hat shape (rectangular wave) when the layer inclination angle $\theta_L$ is within a predetermined range ((θ−$\Delta\theta_{max}$) to (θ+$\Delta\theta_{max}$)) as shown in FIG. 3. Since it is difficult to achieve a complete top hat shape in reality, in the present invention, the existential probability of the layer inclination angle in a predetermined range is defined to be distributed in substantially top hat shape while allowing the fluctuations in the existential probability of the plateau section of the distribution curve within the range of ±40% of the average value and fluctuations in the respective domain widths at a riding edge and a falling edge at a riding edge and a falling edge within the range of ±30% of the most-likelihood half width of the entire distribution curve.

Also, there may be a case in which one or more peaks are mixed within the substantially top hat shaped distribution of the layer inclination angle within a predetermined range in reality. However, since the advantages of the present invention is not affected adversely if the peak value of the existential probability does not exceed 1000% of the average value with the peaks excluded, such a case is also included in the present invention. Preferably, the number of peaks is on the order of five or less.

The uniformity of the diffuse light intensity depends not only on the existential probability of the layer inclination angle, but also on the length of the layer, and as the repetition of multiple reflections of the incident light increases with increase in length of the layer, more uniform diffuse light intensity distribution characteristics is obtained. Therefore, a permissible range becomes wider than that described above in the case of a thick film having the film thickness L larger than $50 \times y_{max}$. Here, $y_{max}$ means either one of $y_1$ and $y_2$ which is greater.

With the film (1) which satisfies the conditions described above, the light incoming thereto from the angular range of diffusion of the incident light is diffused into the angular range of diffusion of the outgoing light at substantially uniform light intensity.

Here, the angular range of diffusion of the incident light $\theta_{in}$ are represented by the following expression.

$$\text{Min}[\theta_1', \theta_1'', \theta_2', \theta_2''] \leq \theta_{in} \leq \text{Max}[\theta_1', \theta_1'', \theta_2', \theta_2'']$$

$$\theta_1' = \sin^{-1}[n_1 \times \sin\{\theta + \Delta\theta_{max} + \cos^{-1}(n_2/n_1)\}] \quad (1)$$

$$\theta_1'' = \sin^{-1}[n_1 \times \sin\{\theta - \Delta\theta_{max} + \cos^{-1}(n_2/n_1)\}] \quad (2)$$

$$\theta_2' = -\sin^{-1}[n_1 \times \sin\{-(\theta + \Delta\theta_{max}) + \cos^{-1}(n_2/n_1)\}] \quad (3)$$

$$\theta_2'' = -\sin^{-1}[n_1 \times \sin\{-(\theta - \Delta\theta_{max}(+\cos^{-1}(n_2/n_1)\}] \quad (4)$$

Max{a, b} represents either one of a and b which is greater, and Min{a, b} represents either one of a and b which is smaller (hereinafter).

The angular range of diffusion of the outgoing light $\theta_{out}$ is represented as follows.

$$\text{Min}[\theta_1', \theta_1'', \theta_2', \theta_2''] \leq \theta_{out} \leq \text{Max}[\theta_1', \theta_1'', \theta_2', \theta_2''] \quad (5)$$

Figure 4:
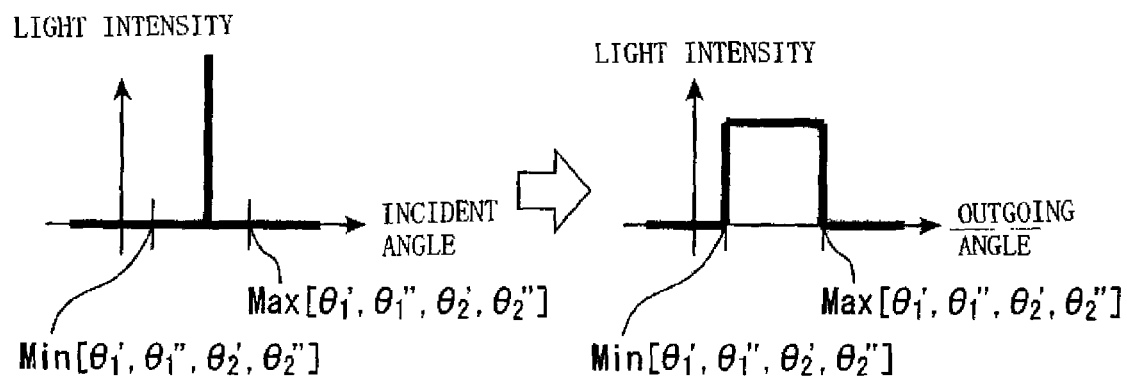
FIG. 4 is a distribution chart of the light intensity showing a relation between the incident angle and the outgoing angle of the film (1).

The above-described relation between the incident angle and the outgoing angle is shown in FIG. 4.

The above-described angles $\theta_1'$, $\theta_1''$, $\theta_2'$, $\theta_2''$ are derived as follows.

The film (1) has an optical waveguides of the step index type (hereinafter, referred to also as waveguides simply) being arranged in one-dimensional array and constitutes a layer structure, and the direction of the layers are fluctuated. Assuming that the average direction of the layers is $\theta$, and a model having fluctuations of $\pm\Delta\theta_{max}$ with respect to $\theta$ will be considered. When this model has a uniform fluctuation in distribution of the layer inclination angle between $(\theta - \Delta\theta_{max})$ and $(\theta + \Delta\theta_{max})$, a light beam having an angle between a critical angle determined by $(\theta - \Delta\theta_{max})$ and a critical angle determined by $(\theta + \Delta\theta_{max})$ repeats multiple reflections, and the angle therebetween are uniformly filled. In this mechanism, when the reflecting surface is not constituted by straight films but curves, and a plane wave (light beam) incoming from a certain direction is converted into a curved wave (spherical wave when the reflecting surface is formed of curves of second order), and when the angle exceeds the critical angle, there is little reflection occurs any longer and diffusion characteristics of the top hat type which does not depend on the direction of incidence, appear. The angle which determines the top hat characteristics is the critical angle determined by $(\theta - \Delta\theta_{max})$ and the critical angle determined by $(\theta + \Delta\theta_{max})$.

There are two critical angles determined by the layer inclination angle $(\theta - \Delta\theta_{max})$ on the upper side and the lower side of the waveguide, and likewise, there are two critical angles determined by the layer inclination angle $(\theta + \Delta\theta_{max})$ on the upper side and the lower side of the waveguide, and hence there exist four angles in total.

Figure 14:
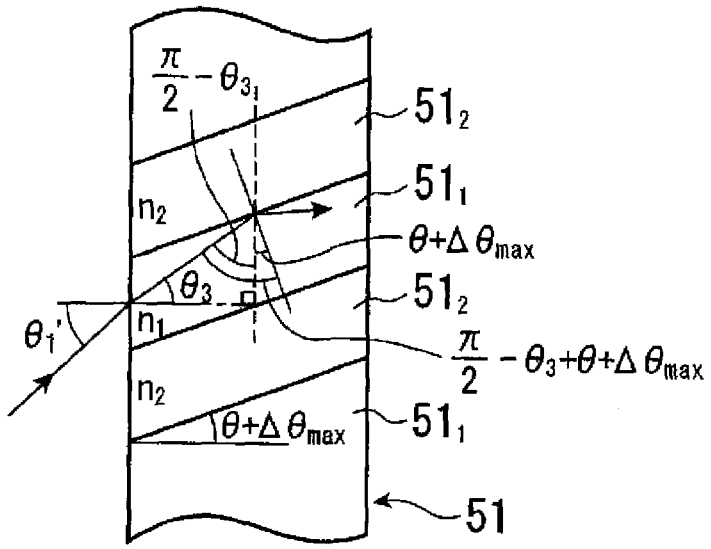
FIG. 14 is an explanatory drawing of derivation of a model expression of the film (1).

Derivation in the case of the layer inclination angle $(\theta + \Delta\theta_{max})$ will be shown first. Assuming that $n_{air}$ represents a refractive index of air, $n_1$ represents a reflective index of core $51_1$, $n_2$ represents a refractive index of clad $51_2$ ($n_1 > n_2$), when Snell's Law is applied to the interface of the film on the incident side in FIG. 14, $$n_{air} \times \sin\theta_1' = n_1 \times \sin\theta_3 \quad (A1)$$

is obtained.

Then, the limit angle, that is, the critical angle at which the light entered into the core $51_1$ totally reflects on the upper interface with respect to the clad $51_2$ is given by the following expression.

$$n_1 \times \sin\{\pi/2 - \theta_3 + (\theta + \Delta\theta_{max})\} = n_2 \times \sin 90° \quad (A2)$$

From the expressions (A1) and (A2), $$\theta_1' = \sin^{-1}[n_1 \times \sin\{\theta + \Delta\theta_{max} + \cos^{-1}(n_2/n_1)\}] \quad (A3)$$

is obtained.

Figure 15:
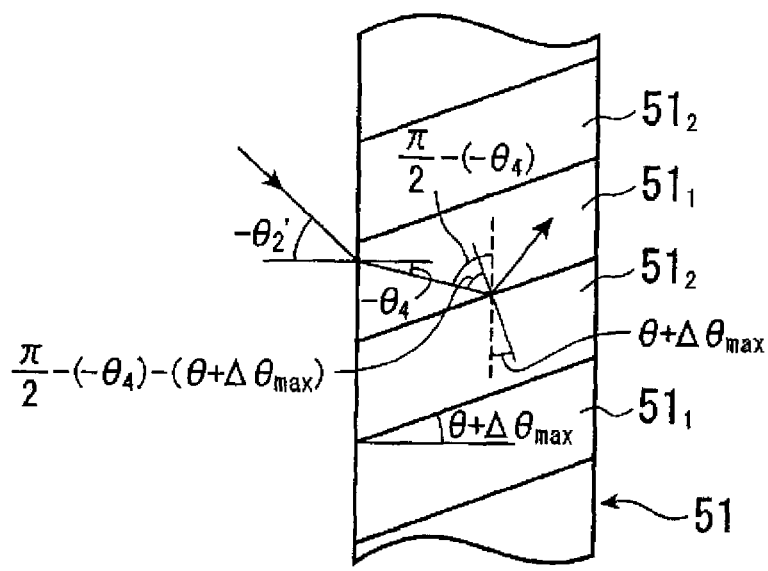
FIG. 15 is an explanatory drawing of derivation of the model expression of the film (1).

Subsequently, the angle which is determined by the lower interface of the waveguide will be derived. When Snell's Law is applied to the film interface of the incident side in FIG. 15, $$n_{air} \times \sin(-\theta_2') = n_1 \times \sin(-\theta_4) \quad (A4)$$

is obtained.

Then, the limit angle (critical angle) at which the light entered into the core $51_1$ totally reflects on the lower interface with respect to the clad $51_2$ is given by the following expression.

$$n_1 \times \sin\{\pi/2 - (-\theta_4) - (\theta + \Delta\theta_{max})\} = n_2 \times \sin 90° \quad (A5)$$

From the expressions (A4), (A5), $$\theta_2' = -\sin^{-1}[n_1 \times \sin\{-(\theta + \Delta\theta_{max}) + \cos^{-1}(n_2/n_1)\}] \quad (A6)$$

is obtained.

A method of derivation of the angles $\theta_1'$ and $\theta_2'$ which are determined by the upper and lower core/clad interfaces in the case of the layer inclination angle $(\theta + \Delta\theta_{max})$ are described above.

Likewise, in the case of the layer inclination angle $(\theta - \Delta\theta_{max})$, the angles can be obtained by substituting $(\theta - \Delta\theta_{max})$ for $(\theta + \Delta\theta_{max})$ in the expressions (A3) and (A6), and the expressions are as follows.

$$\theta_1'' = \sin^{-1}[n_1 \times \sin\{\theta - \Delta\theta_{max} + \cos^{-1}(n_2/n_1)\}] \quad (A7)$$

$$\theta_2'' = -\sin^{-1}[n_1 \times \sin\{-(\theta - \Delta\theta_{max}) + \cos^{-1}(n_2/n_1)\}] \quad (A8)$$

Derivation of the four angles is now completed.

In the case of the film (1), the diffuse light intensity distribution characteristics of the outgoing light are determined by the existential probability of the layer inclination angle. In the example shown above, since the incident light is diffused in the light intensity distribution of the top hat type, the existential probability of the layer inclination angle is distributed in the top hat shape as shown in FIG. 3. However, by varying the existential probability so as to be distributed in substantially top hat shape (including the trapezoidal shape or the like) from the theory based on the same physical law, other desired diffuse light intensity distribution characteristics other than that of the top hat type (such as trapezoidal shape, Gaussian distribution or the like) may be obtained.

In the example shown in FIGS. 1 to 2, the film in which the layer inclination angle is fluctuated only in the direction of the thickness and the layer inclination angle is not fluctuated in the direction in the plane has been described. However, by causing the layer inclination angle to be fluctuated not only in the direction of thickness, but also in the direction in the plane, or by causing the layer inclination angle to be fluctuated only in the direction in the plane, and varying the existential probability of the layer inclination angle according to the theory based on the same physical law as the example shown above, desired diffuse light intensity distribution characteristics can be achieved.

Although the film surface is a planer surface in the example shown in FIG. 1 to FIG. 2, a case in which the film surface is a curved surface can be treated in the same manner by considering the curved surface to be a group of minute planes.

Although there are two types of layers in the example in FIG. 1 to FIG. 2, a structure having three or more types of layers may also be treated in the same manner.

Subsequently, the diffusion film (film (2)) of a second embodiment will be described.

Figure 5:
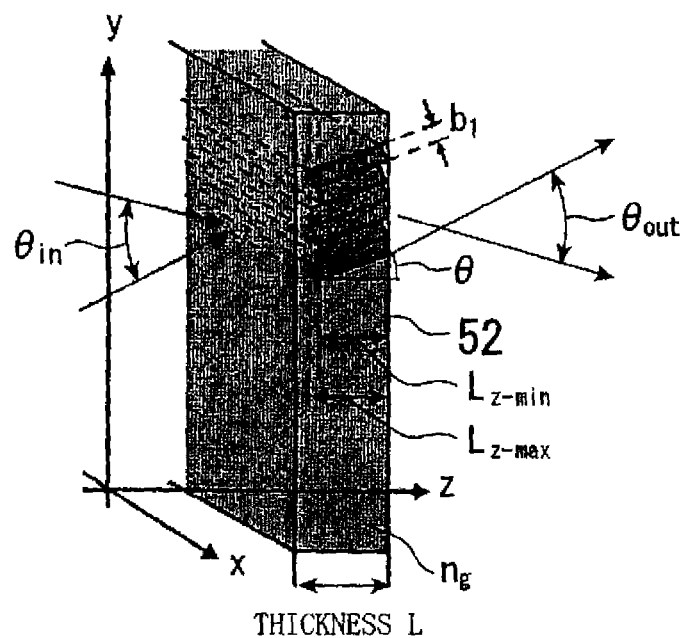
FIG. 5 is a pattern diagram showing an example of a film (2).

FIG. 5 is a pattern diagram showing an example of a film (2). A principal portion of FIG. 5 is shown in an enlarged scale in FIG. 6. A film (2) 52 has a structure as shown below and hence the light incoming from the angular range of diffusion of the incident angle $\theta_{in}$ can be diffused into the angular range of diffusion of the outgoing light $\theta_{out}$. The z-axis extends in the direction parallel to the direction of thickness L of the film (2) 52, and the x-axis and y-axis orthogonal to each other in the plane perpendicular to the z-axis.

The film (2) 52 has a structure in which a plurality of layers $52_1$ of a thickness $b_1$ which is partitioned by interfaces at an inclination angle $\theta$ with respect to the z-direction ($\theta$ which is the same sign as the average inclination angle in film (1) is used) are laminated in a y-direction at a portion in the direction of the film thickness. The layer $52_1$ constitutes an optical waveguide having a refractive index distribution which brings out a light-collecting property in the direction of the layer thickness. The portion of the film (2) other than the layer $52_1$ has a constant refractive index $n_g$. The conditions of the thickness $b_1$ of the layer for causing the incident light to be diffused uniformly are represented as follows using the thickness L of the film (2); $L \geq 10 \times b_1$.

Figure 6:
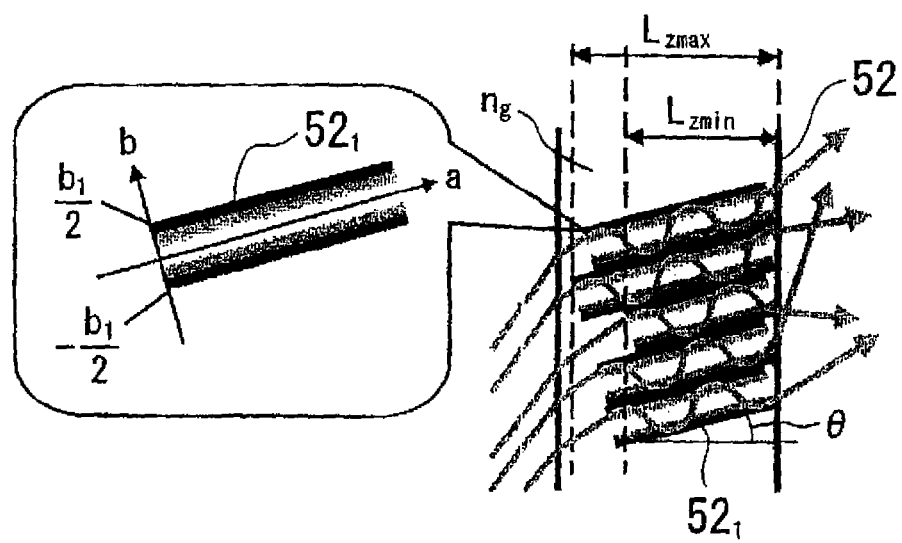
FIG. 6 is a cross-sectional view of a principal portion of FIG. 5 taken in the direction of film thickness and shown in an enlarged scale.

The angle between the interfaces of the layer $52_1$ (angle of the layer) $\theta$ with respect to the z-direction may be 0° (the extending direction of the layer $52_1$ is perpendicular to the film plane). The layer length of the layer $52_1$ (the length in the direction of the film thickness) is assumed to be $L_{zmin}$ to $L_{zmax}$. As shown in FIG. 6, axes obtained by rotating the z-axis and the y-axis about the x-axis by the angle $\theta$ are represented by an a-axis and a b-axis. In other words, the b-axis extends in parallel with the direction of the layer thickness, and the a-axis extends perpendicularly with respect to the b-axis and the x-axis.

Figure 7:
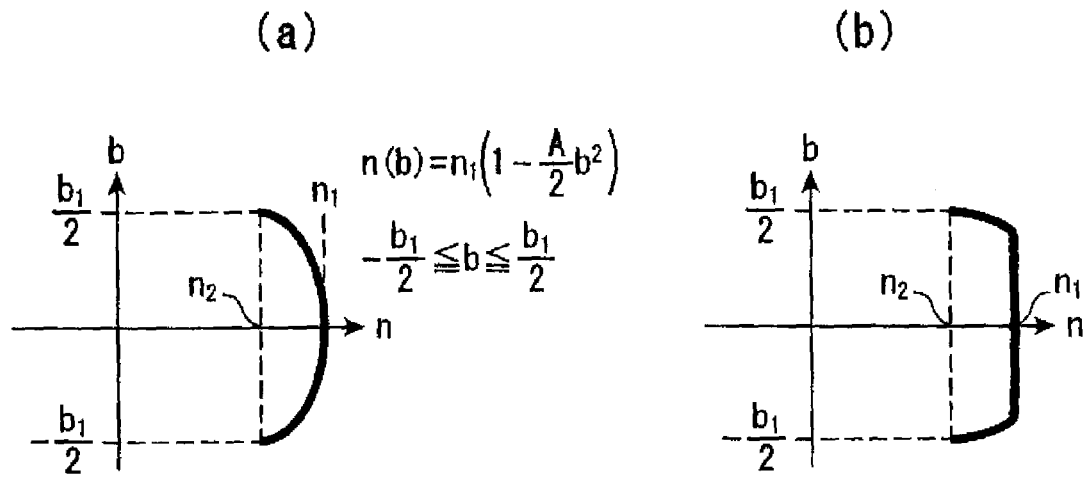
FIG. 7 is a drawing showing an example of refractive index distribution functions which brings out a light-collecting property in the direction of the layer thickness.

There is an example of the refractive index distribution function which brings out the light-collecting property in the direction of the layer thickness as shown in FIG. 7. FIG. 7(a) shows a waveguide of a gradient index type which has a refractive index distribution represented by the following expression.

$$n(b)=n_1\times(1-(A/2)\times b^2), -b_1/2 \leq b \leq b_1/2, \text{A: coefficient} \quad (6)$$

Here, the conditions of the layer length for causing the incident light to be diffused uniformly are represented by the following expressions using the layer inclination angle $\theta$, the maximum value $L_{zmax}$ and the minimum value $L_{zmin}$ of the layer length, and the pitch P of the optical waveguide.

$$L_{zmax}-L_{zmin} \geq (P/2) \times \cos\theta \quad (7)$$

$$P=2\times\pi/\sqrt{A} \quad (8)$$

$$A=(8/b_1^2)\times(n_1-n_2)/n_1 \quad (9)$$

Figure 8:
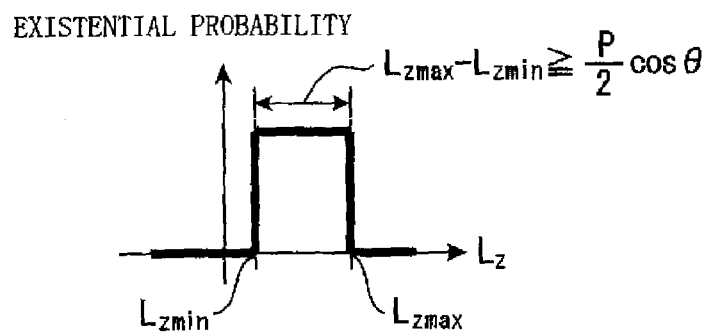
FIG. 8 is a distribution chart showing a state in which the layer length of the film (2) is distributed uniformly within a predetermined range.

At this time, it is ideal that the existential probability of the layer length is distributed in the top hat shape as shown in FIG. 8. However, since it is difficult to achieve the complete top hat shape in reality, in the present invention, the existential probability of the layer length in the range between $L_{zmin}$ and $L_{zmax}$ is defined to be distributed in substantially top hat shape while allowing the fluctuations in the existential probability of the plateau section of the distribution curve within the range of ±40% of the average value and fluctuations in the domain width at the riding edge and the falling edge within the range of ±30% of the most-likelihood half width of the entire distribution curve.

With the film (2) which satisfies the conditions described above, the light incoming thereto from the angular range of diffusion of the incident light is diffused into the angular range of diffusion of the outgoing light at a substantially uniform light intensity.

Here, the angular range of diffusion of the incident light $\theta_{in}$ is represented by the following expressions.

$$\theta_{NA2} \leq \theta_{in} \leq \theta_{NA1} \quad (10)$$

$$\theta_{NA1}=\sin^{-1}\{n_g \times \sin(\theta+\theta_{g1})\} \quad (11)$$

$$\theta_{NA2}=\sin^{-1}\{n_g \times \sin(\theta-\theta_{g1})\} \quad (12)$$

$$\sin\theta_{g1}=(n_1/n_g)\times\sin\{\tan^{-1}(n_1\times\sqrt{A}\times b_1/2)\} \quad (13)$$

The angular range of diffusion of the outgoing light $\theta_{out}$ is represented as follows.

$$\theta_{NA2} \leq \theta_{out} \leq \theta_{NA1} \quad (14)$$

Figure 9:
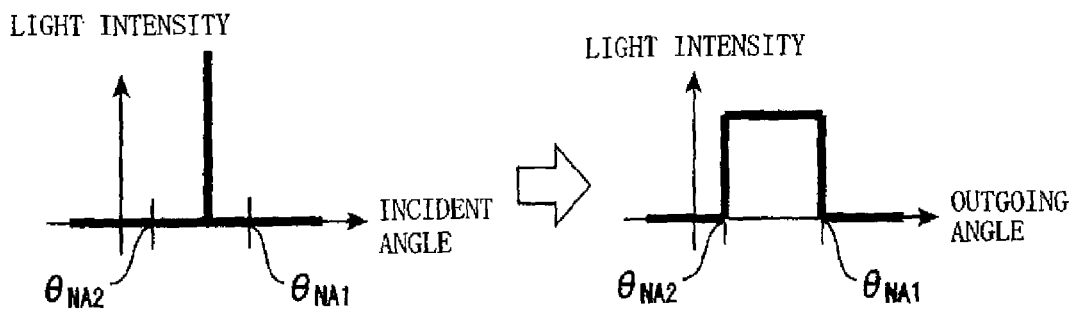
FIG. 9 is a distribution chart of the light intensity showing a relation between the incident angle and the outgoing angle of the film (2).
Figure 10:
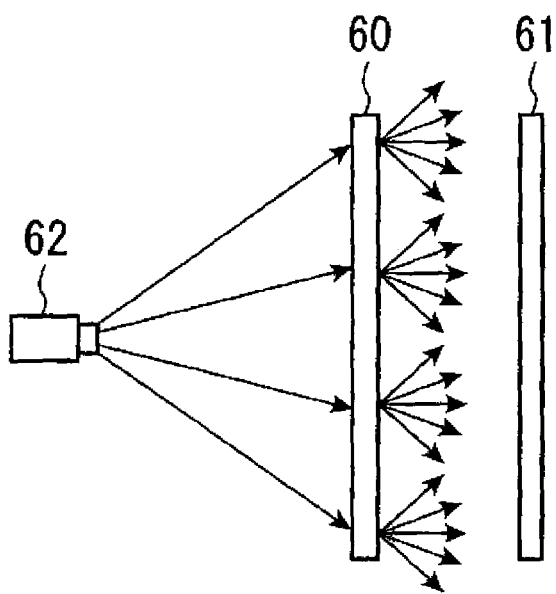
FIG. 10 is a conceptual drawing of a rear projection display screen formed by a diffusion film for causing an incident light from a specific angular range to a specific angular range.
Figure 11:
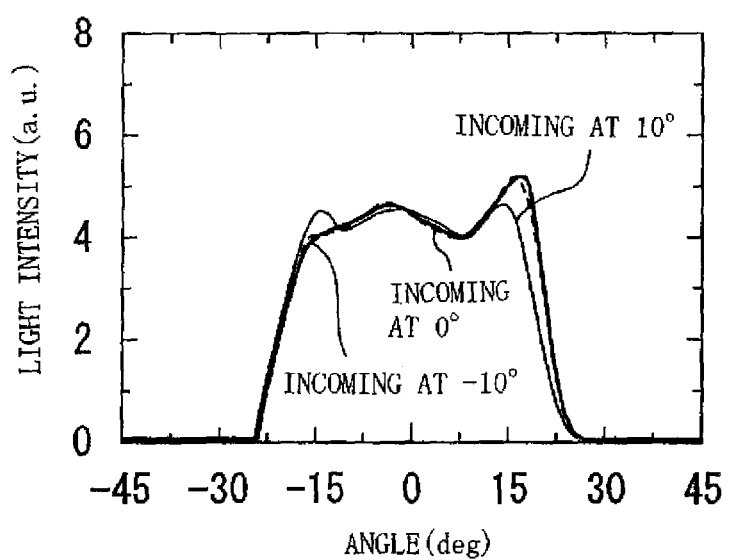
FIG. 11 is a distribution chart of the light intensity showing the diffusion characteristics of the screen shown in FIG. 10.

The above-described relation between the incident angle and the outgoing angle are shown in FIG. 9.

Since the light entered into an optical waveguide of the gradient index type having the refractive index distribution in FIG. 7(a) propagates within the waveguide while changing the direction of travel in the range of:

$$\theta-\tan^{-1}(n_1\times\sqrt{A}\times b_1/2) \sim \theta+\tan^{-1}(n_1\times\sqrt{A}\times b_1/2) \quad (15)$$

the diffuse light intensity distribution characteristics are determined by the difference in the existential probability of the layer length.

As described above, in one mode of the film (2), since the optical waveguides of the gradient index type have an array structure, and the direction of light propagation differs by the position in the direction of the length of the optical waveguide, the outgoing angle at the outgoing end surface differs from waveguide to waveguide when there are fluctuations in length of the waveguides, which brings out the diffusion of light. Therefore, when variation in the direction of propagation in the waveguide is linear with respect to the length of the waveguide, the diffusion characteristics of the top hat type is realized because of the uniform fluctuation in length.

Expressions for analyzing this mechanism will now be derived and described.

Figure 16:
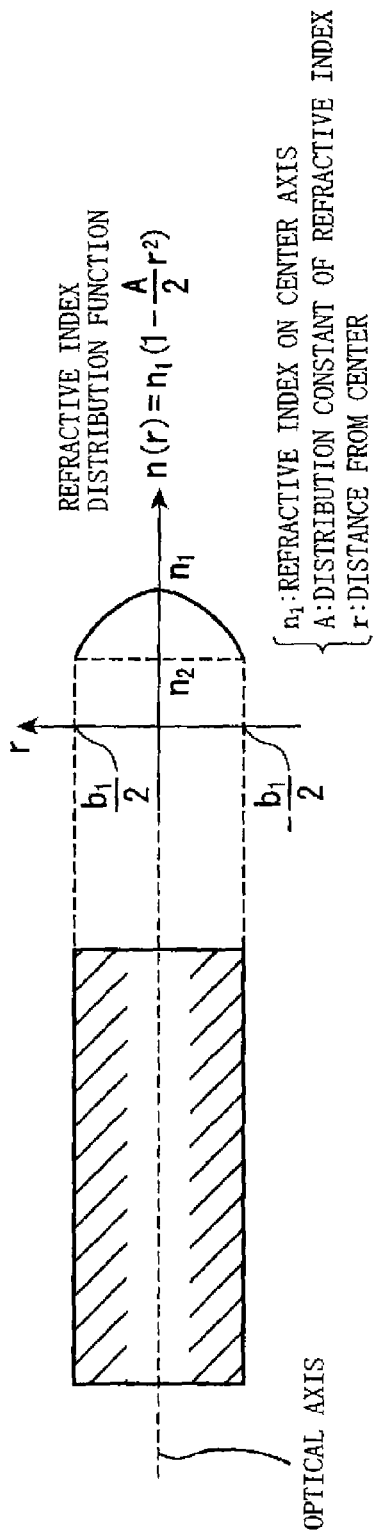
FIG. 16 is a drawing showing a refractive index distribution of an optical waveguide of the gradient index type.

First of all, attention is focused on one of the optical waveguides. As shown in FIG. 16, it is assumed that the refractive index distribution function is given by the following quadratic function;

$$n(r)=n_1\times(1-A/2\times r^2) \quad (B1)$$

symmetrically from the center of the optical waveguide.

Here, $n_1$ represents a refractive index on the center axis, A represents a distribution constant of the refractive index, and r represents a distance from the center. Assuming that a refractive index at position coordinates $\pm b_1/2$ on both interfaces in the direction of the thickness of the optical waveguide is $n_2$, the expression:

$$A=(8/b_1^2)\times(n_1-n_2)/n_1$$

Figure 17:
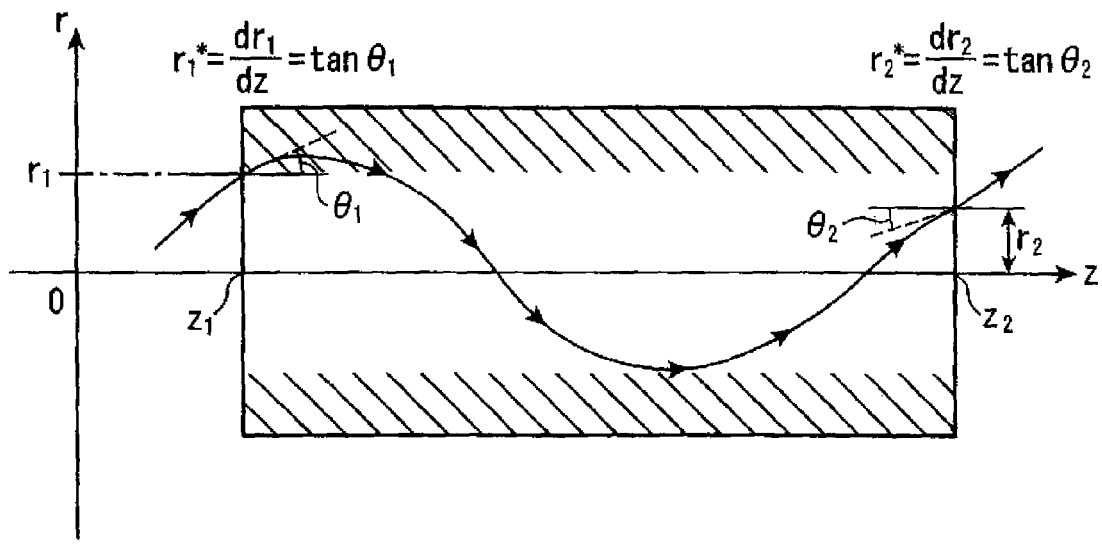
FIG. 17 is a drawing showing light propagation within the optical waveguide of the gradient index type.

As shown in FIG. 17, a z-axis is placed at the center of the optical waveguide of the gradient index type, and the position of the light incident surface is assumed to be $z=z_1$. The distance from the z-axis is r. The distance from the z-axis at the position of the light incident surface is represented by $r_1$, the direction of the light beam in the optical waveguide at this position is assumed to be $r_1{}^*=dr_1/dz=\tan\theta_1$. Likewise, the position of the light outgoing surface is assumed to be $z=z_2$, and the distance from the z-axis is represented by $r_2$, and the direction of the light beam in the optical waveguide at this position is assumed to be $r_2{}^*=dr_2/dz=\tan\theta_2$.

Between the vector that represents the position and the direction of the light beam on the light incident surface (input vector) $[r_1, r_1{}^*]$ and the vector that represents the position and the direction of the light beam on the light outgoing surface (output vector) $[r_2, r_2{}^*]$, a relation as represented by the following expression (B2) is established.

[Expression 1]

$$\begin{bmatrix} r_2 \\ r_2^* \end{bmatrix} = \begin{bmatrix} \cos\{\sqrt{A}(z_2-z_1)\} & \dfrac{\sin\{\sqrt{A}(z_2-z_1)\}}{n_1\sqrt{A}} \\ -n_1\sqrt{A}\sin\{\sqrt{A}(z_2-z_1)\} & \cos\{\sqrt{A}(z_2-z_1)\} \end{bmatrix} \begin{bmatrix} r_1 \\ r_1^* \end{bmatrix} \quad (B2)$$

The expression (B2) means that being irrespective of the incident position $r_1$ of the light and the direction $r_1{}^*$ of the light beam at this position, distance from the z-axis and direction of the light beam at a position is periodically restored to the initial state when traveled by a certain distance toward the z-axis. The distance in the direction of the z-axis which is restored periodically to the original state is a pitch (P) of the optical waveguide of the gradient index type. For the sake of simplicity, when the position of the incident surface is assumed to be $z_1=0$, the expression (B3) is obtained from the expression (B2).

[Expression 2]

$$\begin{bmatrix} r_2 \\ r_2^* \end{bmatrix} = \begin{bmatrix} \cos(\sqrt{A}z_2) & \dfrac{\sin(\sqrt{A}z_2)}{n_1\sqrt{A}} \\ -n_1\sqrt{A}\sin(\sqrt{A}z_2) & \cos(\sqrt{A}z_2) \end{bmatrix} \begin{bmatrix} r_1 \\ r_1^* \end{bmatrix} \quad (B3)$$

The pitch (P) is obtained from the expression (B3). Since the components of 2 rows×2 columns in the expression (B3) are functions of sin and cos, when the $\sqrt{A}\times z_2$ is changed by $2\pi$, the position and the direction of the light beam is restored to the initial state, and hence the pitch (P) can be obtained from the following expression.

$$\sqrt{A}\times P=2\pi \quad (B4)$$

Therefore;

$$P=2\pi/\sqrt{A} \quad (B5)$$

Figure 18:
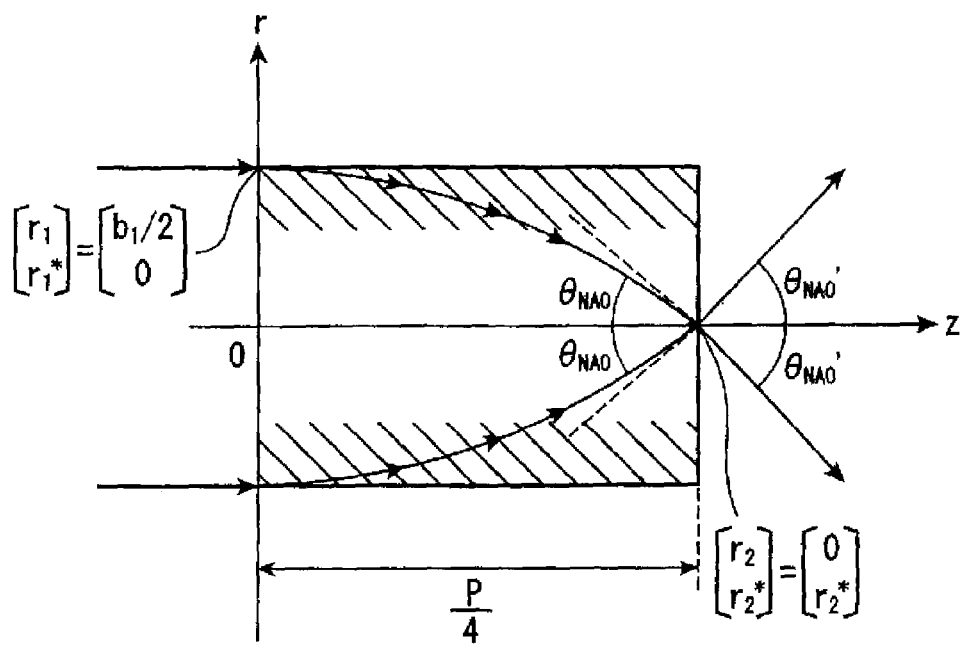
FIG. 18 is an explanatory drawing showing how to calculate the NA.

Subsequently, the numerical aperture NA is calculated. The NA is given by the largest angle out of the angles between the light beam which can be propagated in the optical waveguide of the gradient index type and the optical axis. In order to obtain the value of NA, as shown in FIG. 18, the length $z_2$ of the optical waveguide of the gradient index type is represented by P/4, and the position of the incident light beam on the plane of $z_1=0$ is assumed to be $r_1=b_1/2$ (an end of the optical waveguide in the direction of thickness) and the direction of the light beam is assumed to be parallel with the optical axis ($r_1{}^*=dr_1/dz=\tan\theta_1=0$).

Therefore, the input vector $[r_1\, r_1{}^*]$ will be expressed by the following expression (B6). While the output vector $[r_2\, r_2{}^*]$ will be expressed by the following expression (B7), since $r_2=0$ as the length of the optical waveguide of the gradient index type $z_2=P/4$, and the incident light beam is parallel to the optical axis. By using the expression (B5): $P=2\pi/\sqrt{A}$, the expression: $z_2=P/4$ becomes the following expression (B8). Then substitution of the expressions (B6), (B7) and (B8) into the expression (B3), and arrangement thereof, will lead to the following expression (B9).

[Expression 3]

$$\begin{bmatrix} r_1 \\ r_1^* \end{bmatrix} = \begin{bmatrix} \dfrac{b_1}{2} \\ 0 \end{bmatrix} \quad (B6)$$

$$\begin{bmatrix} r_2 \\ r_2^* \end{bmatrix} = \begin{bmatrix} 0 \\ r_2^* \end{bmatrix} \quad (B7)$$

$$z_2 = \dfrac{P}{4} = \dfrac{\pi}{2\sqrt{A}} \quad (B8)$$

$$\begin{bmatrix} r_2 \\ r_2^* \end{bmatrix} = \begin{bmatrix} 0 & \dfrac{1}{n_1\sqrt{A}} \\ -n_1\sqrt{A} & 0 \end{bmatrix} \begin{bmatrix} \dfrac{b_1}{2} \\ 0 \end{bmatrix} \quad (B9)$$

The angle $\theta_{NA0}$ with respect to the optical axis on the outgoing surface in the optical waveguide is given from the expression (B9).

$$r_2{}^*=\tan\theta_{NA0}=-n_1\times\sqrt{A}\times b_1/2 \quad (B10)$$

Therefore, from the expression (B10), assuming that $\theta_{NA0}$ is a positive value, $\theta_{NA0}$ is given by the following expression.

$$\theta_{NA0}=\tan^{-1}(n_1\times\sqrt{A}\times b_1/2) \quad (B11)$$

The outgoing angle $\theta'_{NA0}$ of this light to the air layer satisfies the relation of the following expression by applying Snell's Law to the outgoing surface on the optical axis.

$$n_{air}\times\sin\theta'_{NA0}=n_1\times\sin\theta_{NA0} \quad (B12)$$

Here, $n_{air}$ represents the refractive index of air.

From the expressions (B11) and (B12), the NA of the optical waveguide of the gradient index type is given by the following expression.

$$NA=\sin\theta'_{NA0}=(n_1/n_{air})\times\sin\{\tan^{-1}(n_1\times\sqrt{A}\times b_1/2)\} \quad (B13)$$

Therefore, when fluctuations in the length of the optical waveguides of the gradient index type, $L_{zmax}-L_{zmin}$ is larger than P/2 and the fluctuations are uniform, light diffusion of the top hat type is brought out within the angle $\pm\theta'_{NA0}$ of the NA given by the expression (B13).

The analysis described above is for the case in which the optical axis of the optical waveguide of the gradient index type coincides with the normal line of the film plane.

Figure 19:
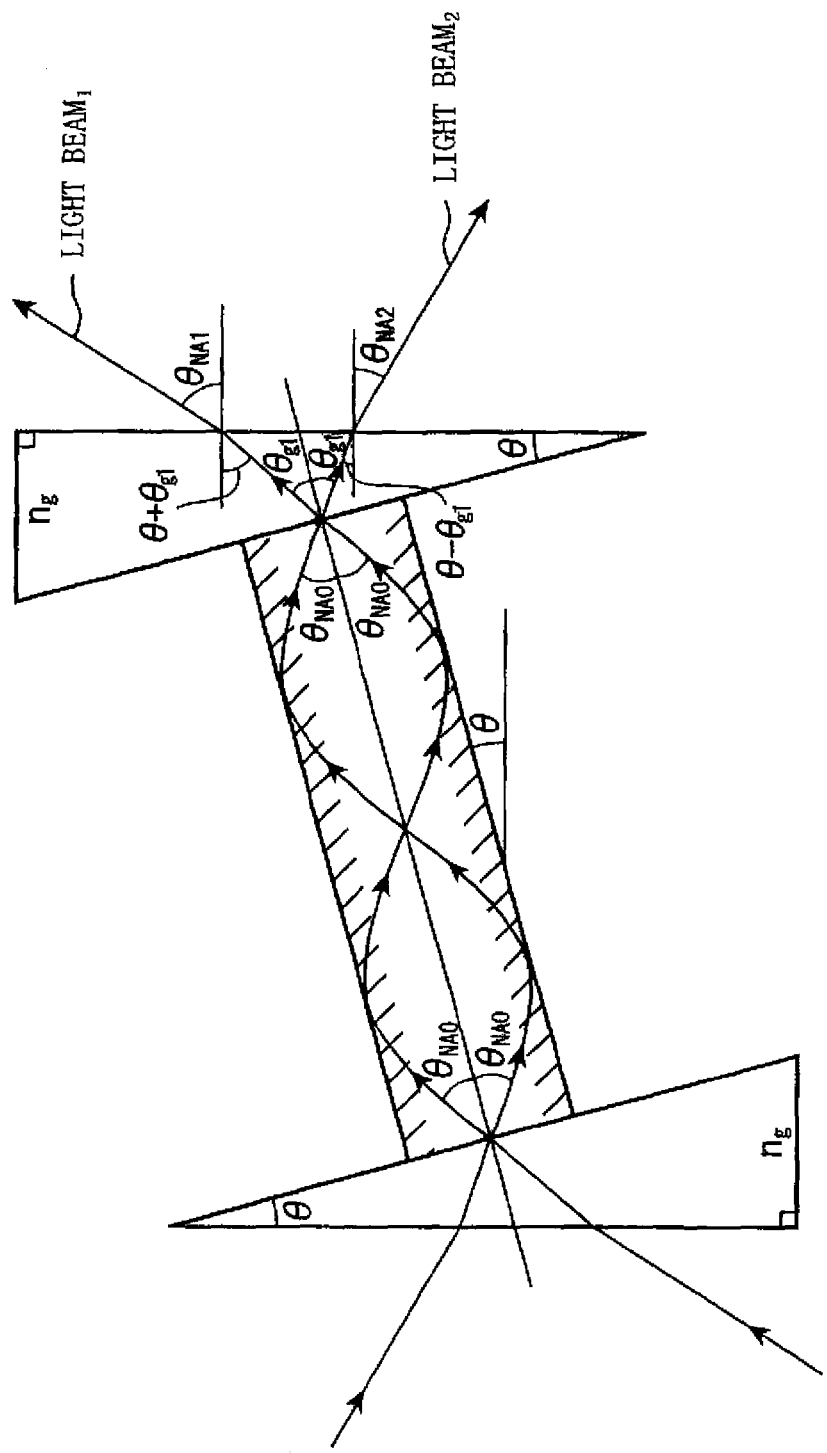
FIG. 19 is an explanatory drawing showing how to calculate the NA when an optical axis of the optical waveguide of the gradient index type is inclined by an angle $\theta$ with respect to a normal line of the film surface.

Subsequently, analysis will be made for the case in which the optical axis is inclined by an angle θ with respect to the normal line of the film plane. As shown in FIG. 19, when there exists the optical waveguide of the gradient index type inclined by θ in the film, the optical system in which the prisms of the same apex angle are arranged on the incident side and the outgoing side of the optical waveguide on the opposite direction is obtained. By obtaining the NA of this optical system, the top hat characteristics of the film configured by the optical waveguide of the gradient index type inclined by θ can be described.

Since the optical system shown in FIG. 19 has the same structure on the incident side and the outgoing side, analysis is made on the outgoing side. $θ_{NA0}$ in FIG. 19 is given by the expression (B11). When Snell's Law is applied to the optical axis of the optical waveguide of the gradient index type and the boundary portion with respect to the prism on the outgoing side, the following expression is obtained, $$n_1 \times \sin θ_{NA0} = n_g \times \sin θ_{g1} \quad (B14),$$

where $n_g$ represents the refractive index of the prism.

Subsequently, focusing attention on the light beam$_1$ which travels upward, when Snell's law is applied to the boundary where this light beam goes out from the prism to the air layer, the following expression is obtained.

$$n_g \times \sin(θ + θ_{g1}) = n_{air} \times \sin θ_{NA1} \quad (B15)$$

Subsequently, focusing attention on the light beam$_2$ which travels downward, when Snell's Law is applied to the boundary where it goes out from the prism to the air layer, the following expression is obtained.

$$n_g \times \sin(θ - θ_{g1}) = n_{air} \times \sin θ_{NA2} \quad (B16)$$

When $\sin θ_{g1}$ is obtained by substituting $θ_{NA0}$ in the expression (B11) into the expression (B14), the following expression is obtained.

$$\sin θ_{g1} = (n_1/n_g) \times \sin\{\tan^{-1}(n_1 \times \sqrt{A} \times b_1/2) \quad (B17)$$

When $θ_{NA1}$ and $θ_{NA2}$ are obtained from the expressions (B15) and (B16) with $n_{air} = 1.0$, the following expressions are obtained respectively.

$$θ_{NA1} = \sin^{-1}\{n_g \times \sin(θ + θ_{g1})\} \quad (B18)$$

$$θ_{NA2} = \sin^{-1}\{n_g \times \sin(θ - θ_{g1})\} \quad (B19)$$

Therefore, since this optical system has the same structure on the incident side and the outgoing side, the angles of the NA of the input and output are represented by the following expressions.

$$θ_{NA2} \leq θ_{in} \leq θ_{NA1} \quad (B20),$$

$$θ_{NA2} \leq θ_{out} \leq θ_{NA1} \quad (B21)$$

The angle of meandering of light in the optical waveguide falls within the range between $θ - θ_{NA0}$ and $θ + θ_{NA0}$, since the optical axis is inclined by θ. When $θ_{NA0}$ in the expression (B11) is substituted thereto, the following expression is obtained.

$$θ - \tan^{-1}(n_1 \times \sqrt{A} \times b_1/2) \sim θ + \tan^{-1}(n_1 \times \sqrt{A} \times b_1/2) \quad (B22)$$

Since the optical axis is inclined by θ, the length of fluctuations is changed to cos θ times of the length when θ=0°, and hence $L_{zmax} - L_{zmin}$ is given by the following expression.

$$L_{zmax} - L_{zmin} \geq (P/2) \times \cos θ \quad (B24)$$

Derivation and description of the expression for the layers of the film (2) having the refractive index distribution in FIG. 7(a) is now ended.

On the other hand, the refractive index distribution in FIG. 7(b) is different from that of the optical waveguide of the gradient index type to some extent. However, since this can also bring out the light-collecting property (the light-collecting property to keep the incident light within the layer) in the direction of the layer thickness, it can be treated in the same manner as the case of the optical waveguide of the gradient index type, and the desired diffuse light intensity distribution characteristics can be obtained by varying the existential probability of the layer length.

Even in the case in which the optical waveguides of the gradient index type having different refractive index distributions from point to point are formed in the film, it can be treated in the same manner.

In the film (2), the diffuse light intensity distribution characteristics of the outgoing light is determined by the direction of light propagation within the layer and the existential probability of the layer length. Although the existential probability of the layer length is assumed to be distributed in the top hat shape in the example shown above in order to cause the incident light to be diffused in the distribution of the light intensity of the top hat type, however, by causing either one or both of the refractive index distribution within the layer and the existential probability according to the theory based on the same physical laws, desired diffuse light intensity distribution characteristics other than those of the top hat type (for example, the trapezoidal type, the Gaussian distribution, and so on) can also be obtained.

Although the film having no fluctuation in layer inclination angle is shown in FIGS. 5 to 6, desired diffuse light intensity distribution characteristics may be obtained by making the angle of layer inclination in the direction in the plane fluctuated and changing the existential probability of the layer inclination angle as in the case of the film (1).

Although the surface of the film is planer in the example shown in FIG. 5 and FIG. 6, even when the film surface is a curved surface, it can be treated in the same manner by considering it to be a group of minute planes.

Although the case in which the adjacent layers are in contact with each other is shown in FIG. 5 and FIG. 6, it can be treated in the same manner even when the adjacent layers are separated by some extent. In this case, however, part of the incident light is not propagated within the layer, and travels along the portion in the film (2) where the refractive index is constant ($n_g$), and hence the percentage of the light which travels straight ahead is increased.

Although the film plane on one side is the incident side in FIG. 5 and FIG. 6, it can be treated in the same manner even when the film plane on the opposite side is employed as the incident side.

Subsequently, diffusion film (film (3), film (4), and film (5)) of a third embodiment will be described. They have a structure in which the structure of the film (1) and the structure of the film (2) are combined.

FIG. 12(a) is a pattern diagram showing an example of the film (3). As shown in the same drawing, a film (3) 53 has a structure in which a part 53$_1$ having the same structure as the film (1) and a part 53$_2$ having the same structure as the film (2) are mixed in the direction of the film thickness.

FIG. 12(b) is a pattern diagram showing an example of the film (4). As shown in the same drawing, a film (4) 54 has a structure in which a part 54$_1$ having the same structure as the film (1), and a part 54$_2$ having the same structure as the film (2) are mixed in the direction of the film plane.

FIG. 12(c) is a pattern diagram showing an example of the film (5). As shown in the same drawing, a film (5) 55 has the same structure 55$_A$ in which the structure of the film (1) and the structure of the film (2) are fused with each other.

Figure 12:
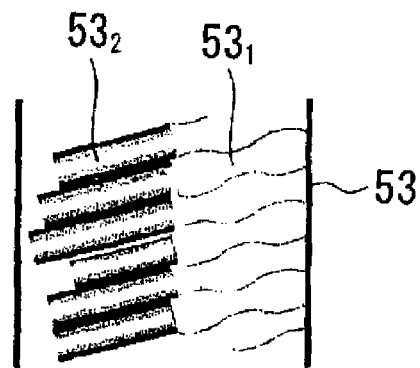
FIG. 12 is pattern diagrams.
Figure 12:
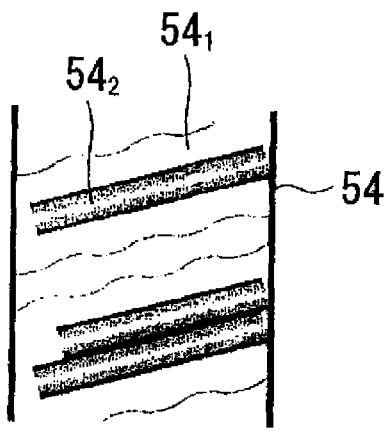
Figure 12:
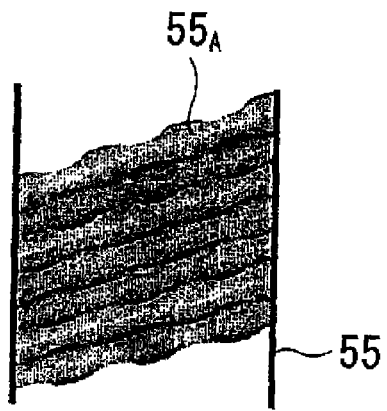

In any of the diffusion films shown in FIG. 12, they can be treated as the respective film (1) and film (2) in the decomposed state, and the angular range of diffusion of the incident light is derived by superimposing the respective films.

Subsequently, a fourth embodiment will be described.

Figure 32:
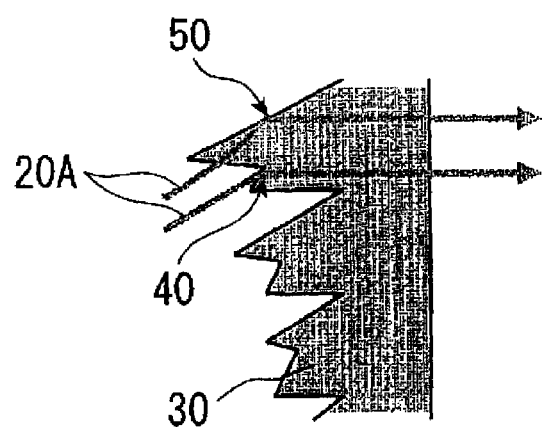
FIG. 32 is a conceptual drawing of a related art using a prism.
Figure 33:
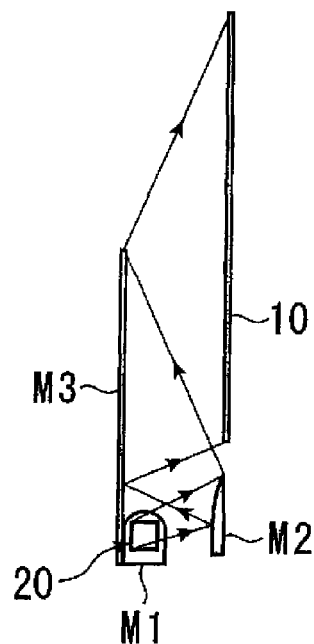
FIG. 33 is (a) a side view and (b) a plan view showing an example of a thin-type rear projection display system.
Figure 33:
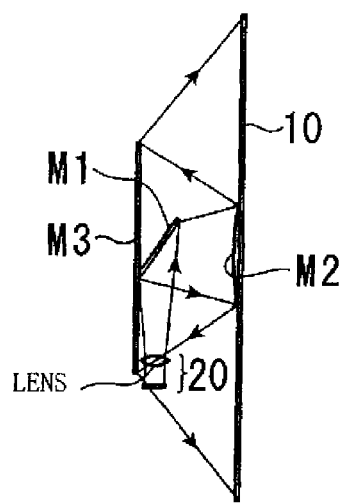

In a rear projection display system (abbreviated as "rear pro"), in order to reduce the thickness of the system, as shown in FIG. 33, for example, an optical engine (projector) 20 is arranged on the lower side of a screen 10, the direction of a light is changed by mirrors (mirrors M1, M3, a non-spherical mirror M2) or the like, and images formed in an oblique direction from the lower side of the screen 10 with respect to a normal line of the screen are used. Therefore, since the diffusion characteristic in this structure is such that the center of a light energy is directed toward the upper side of the screen, a prism 30 (prism sheet) is generally used to direct the center of light intensity toward the normal line of the screen in the related art as shown in FIG. 32.

However, when the prism sheet is used in the thin-type rear-pro, there arise problems such as fluctuation of characteristics due to joint usage of the refraction type and reflection type, and difficulty in manufacture due to the difference in prism shape depending on the location to be provided.

Figure 22:
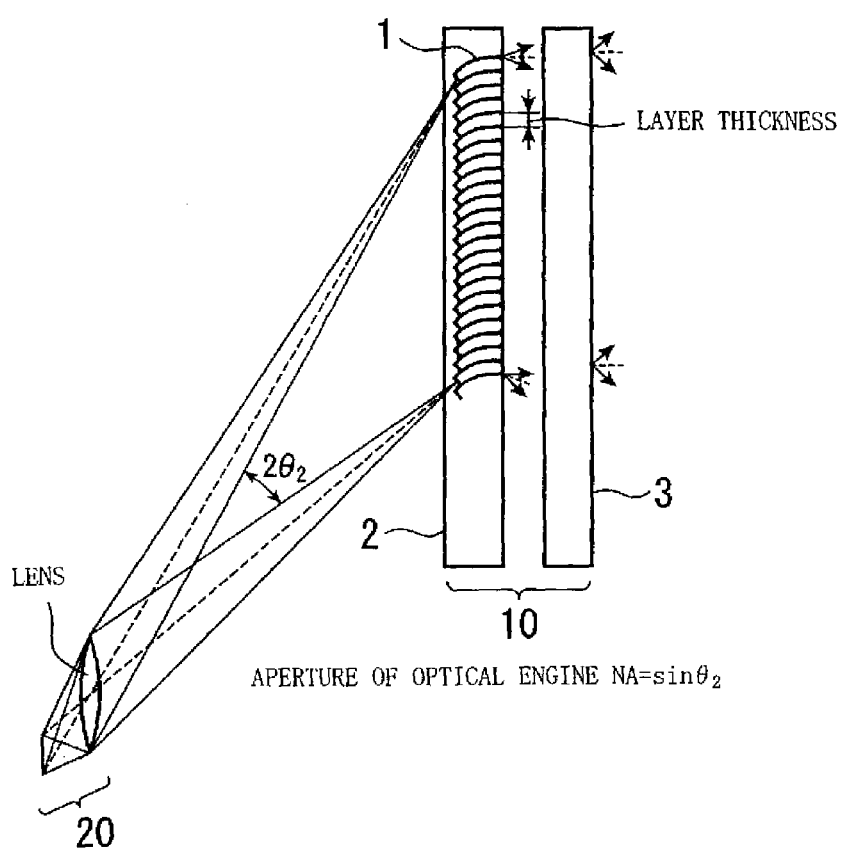
FIG. 22 is a pattern diagram of a cross-sectional side view showing an example of a screen of the present invention, and an example of an optical system for rear projection display system using the same.

In order to overcome such problems, the present invention employs a light-outgoing direction converting film 2 including a plurality of layers 1 which constitute light waveguide arrays arranged in the direction in the film plane in a striped state and extend so as to be bent with respect to the direction of the film thickness instead of the prism sheet in the related art as shown in FIG. 22. Reference numeral 3 designates a diffusion film for causing a light incoming from an angular range of diffusion of the incident light to be diffused into the angular range of diffusion of the outgoing-light. The diffusion film 3 and the light outgoing direction converting film 2 constitute the screen 10.

The optical waveguide 1 of the light-outgoing direction converting film 2 is an optical waveguide of a step index type or an optical waveguide of a type having a distribution of refractive indexes which brings out a light-collecting property in the direction of the layer thickness (for example, gradient index type).

Figure 23:
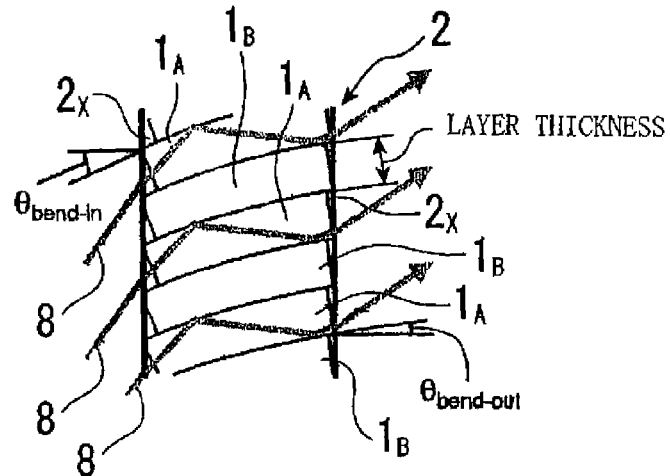
FIG. 23 is a pattern diagram showing an example of a light-outgoing direction converting film in a case in which a curved optical waveguide array is of a step index type.

FIG. 23 is a pattern diagram showing an example of a light-outgoing direction converting film in a case in which a curved optical waveguide array is of a step index type. Layers (cores) $1_A$ having a refractive index $n_1$ which constitute the optical waveguides 1 and layers (clads) $1_B$ having a refractive index $n_2$ ($n_1 > n_2$) are layered alternately in the direction in the film plane. Reference numeral $2_X$ designates remaining portion (film portion other than the optical waveguide 1). Boundaries between the layers $1_A$ and $1_B$ are inclined by an angle of $\theta_{bend-in}$ on the incident side and by $\theta_{bend-out}$ on the outgoing side with respect to the normal line of the film plane. Such an optical waveguide of the step index type can be designed in such a manner that an incident light beam 8 into the core $1_A$ is totally reflected on the layer boundary, while being propagated along a curve of the optical waveguide 1 in the core $1_A$, and goes out with the direction of the center of the light intensity directed in a desired direction (for example, in the direction of the normal line to the film plane) determined by $\theta_{bent-out}$.

Figure 25:
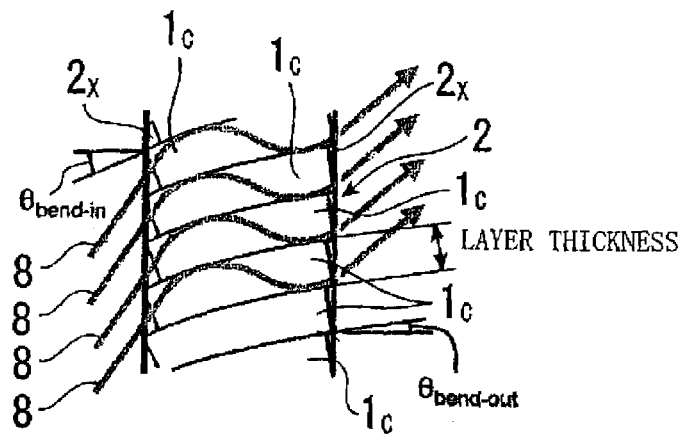
FIG. 25 is a pattern diagram showing an example of the light-outgoing direction converting film in a case in which the curved optical waveguide array is of a type having a distribution of refractive indexes which brings out a light-collecting property in the direction of the layer thickness.

FIG. 25 is a pattern diagram showing an example of the light-outgoing direction conversion film in the case in which the curved optical waveguide array is of a type having a distribution of refractive indexes which brings out a light-collecting property in the direction of the layer thickness. Layers $1_C$ having the distribution of refractive indexes that brings out the light-collecting property in the direction of the layer thickness are layered in the direction in the film plane to constitute the optical waveguide array. Reference numeral $2_X$ designates the remaining portion (film portion other than the optical waveguide 1). Boundaries of the layers $1_C$ are inclined by $\theta_{bend-in}$ on the incident side and by $\theta_{bend-out}$ on the outgoing side with respect to the normal line to the film plane. The optical waveguide of the type having the distribution of refractive indexes that brings out the light-collecting property in the direction of the layer thickness can be designed in such a manner that the light beam 8 entered into the layer $1_C$ is propagated in the layer $1_C$ along the curve of the optical waveguide 1 while being refracted so as to draw a wave shape having an amplitude corresponding to the distance between the layers and goes out with the direction of the center of the light intensity directed in the desired direction (for example, the direction of the normal line to the film plane) determined by $\theta_{bend-out}$.

Figure 26:
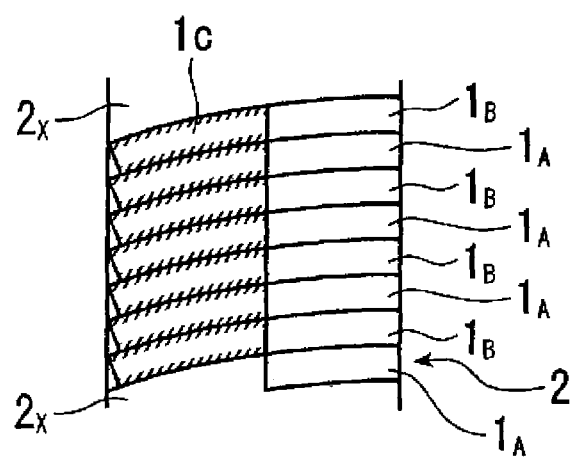
FIG. 26 is a pattern diagram showing (a) an example in which the optical waveguide array of the step index type and the optical waveguide array of the type having a distribution of refractive indexes which brings out a light-collecting property in the direction of the layer thickness are mixed in the direction of the film thickness, and (b) an example in which these arrays are mixed in the direction in a film plane.
Figure 26:
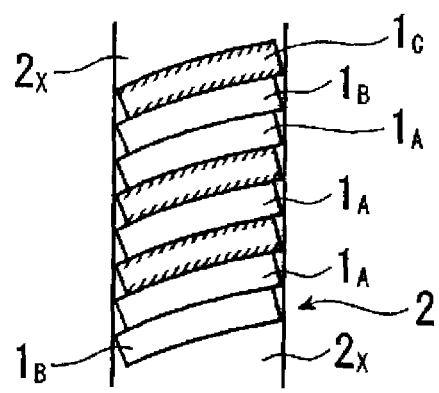

A single sheet of the light-outgoing direction converting film may include only the optical waveguide of one of the step index type and the type having the distribution of the refractive indexes which brings out the light-collecting property in the direction of the layer thickness, or the optical waveguides of both types exist one or both of the direction in the film plane and the direction of the film thickness in a mixed manner. FIG. 26 show examples in which the optical waveguide array of the step index type and the optical waveguide array of the type having the distribution of refractive indexes which brings out the light-collecting property in the direction of the layer thickness exist in the direction of the film thickness in the mixed manner (a), and exist in the direction in the film plane in the mixed manner (b).

All the drawings and analysis disclosed with respect to the fourth embodiment show examples in which the remaining portion $2_X$ having no layer formed therein exists. However, it is a portion which does not contribute directly to the light-outgoing direction converting property, and hence the light-outgoing direction converting property can be brought out also by the structure having no remaining portion $2_X$ or having the same only on one side. This case can also be considered to be the same by considering the propagation of the light in the layers and calculating the refraction in the remaining portion $2_X$ when going out therefrom as in the case of an analysis shown below. Although the cross-section of the remaining portion $2_X$ in the direction of the layer thickness is a triangular shape and one side thereof is assumed to be an air interface of the film in the drawings, it can be considered to be the same even when it has other structure from the same reasons (for example, when the remaining portion $2_X$ is significantly large and there exists partly an range having no layer in the direction of the film thickness).

In the screen configured as described above, the light from the optical engine can be reflected or refracted in the curved optical waveguide and the direction of the center of the light intensity thereof can be directed to the desired direction (for example, in the direction of the normal line to the screen) determined by the $\theta_{bend-out}$. Accordingly, fluctuation of the characteristics due to the joint usage of the refracting type and the reflecting type and difficulty in manufacture due to the difference in prism shape depending on the location to be provided, as in the prism sheet in the related art, are diminished, and hence a light outgoing direction converting film which exerts superior characteristics such as:

6) ghost of an image due to a stray light is not generated;

7) the amount of rearward reflection is small;

8) efficiency of conversion of the light-outgoing direction is high;

9) there is no limit in the angle of conversion of the outgoing direction; and 10) polarization of an incident light is retained can be realized.

As a matter of course, if the outgoing angular range of the light-outgoing direction converting film does not match the angular range of diffusion of the incident light of the diffusion film, part of the projector light does not diffuse in the direction in which the observer exists, and hence the usage efficiency of the projector light is lowered. Therefore, it is preferable that these angular ranges match, and at least it is necessary that 50 percent of the outgoing angular range $\theta_{out}$ of the light-outgoing direction converting film is included in the incident angular range of diffusion film $\theta_{in}$.

Although the diffusion film to be used in combination with the light-outgoing direction conversion film is not specifically limited, the diffusion film used in the first through third embodiments is preferable.

The light-outgoing direction converting film may be converted into the light-outgoing direction converting/diffusing film having substantially top hat shaped diffused light-intensity characteristics by distributing the layer inclination angle of the optical waveguide of the step index type and/or the length of the optical waveguide layers of the type having the distribution of the refractive indexes which brings out the light-collecting property in the direction of the layer thickness into substantially the top hat shape.

The light-outgoing direction converting/diffusing film corresponds to the diffusion film of the first through third embodiments with the optical wave guides therein curved.

The single light-outgoing direction converting/diffusing film may includes only the optical waveguides of one of the step index type and the type having the distribution of refractive indexes which brings out the light-collecting property in the direction of the layer thickness or may includes the optical waveguides of both types in one or both of the direction in the film plane and the direction of the film thickness.

Further, the single light-outgoing direction converting/diffusing film may have a structure in which the optical waveguides of both types described above fused together. This structure has the distribution of refractive indexes in the layers is either one of a function of the distribution of refractive indexes of the step index type or a function of the distribution of refractive indexes which brings out the light-collecting property in the direction of layer thickness, and includes the curved layers in which both of the layer inclination angle and the layer length are distributed so as to be fluctuated substantially in the top hat shape.

Since the light-outgoing converting/diffusing film has a function to diffuse the incident light with having bent in the optical waveguides, by using this film instead of the light-outgoing direction converting film (the light-outgoing direction converting film without the diffusing function), it is not necessary to use an additional diffusing film, and hence the screen can be configured only with the light-outgoing direction converting/diffusing film.

In the screen of the fourth embodiment, the thickness of the respective layers forming the optical waveguides in the light-outgoing direction converting film or the light-outgoing direction converting/diffusing film is preferably smaller than 500 μm considering the size of pixels of the image projected by the general projection display, since images of high resolution cannot be propagated when it is too large.

The film plane of the light-outgoing direction converting film or the light-outgoing direction converting/diffusing film is not limited to a planer surface, and may be a curved surface. In the case of the curved surface, it can be handled in the same manner by considering it to be a group of minute planes.

When constituting the optical system for projection display system using the screen of the fourth embodiment, matching of an aperture (=Numerical Aperture: abbreviated as NA) with the optical engine is important. The NA of the optical engine is defined as NA=$\sin \theta_2$ where the angular range of a light beam incoming from behind the screen determined by the lens diameter, the focal length, the image-forming magnification, and the image-forming position of the optical engine 20 is assumed to be $2\theta_2(\equiv 2\times\theta_2)$ as shown in FIG. 22 relating the case of the rear projection display, for example.

In the actual optical system for projection display system, the optical element such as a reflective mirror or a lens is arranged between the optical engine and the screen in many cases as shown in FIG. 33, for example. In such a case, the NA is defined in the same manner in the drawing in which the optical system is converted into an optically equivalent mode using only one lens as shown in FIG. 22 or FIG. 27.

Figure 27:
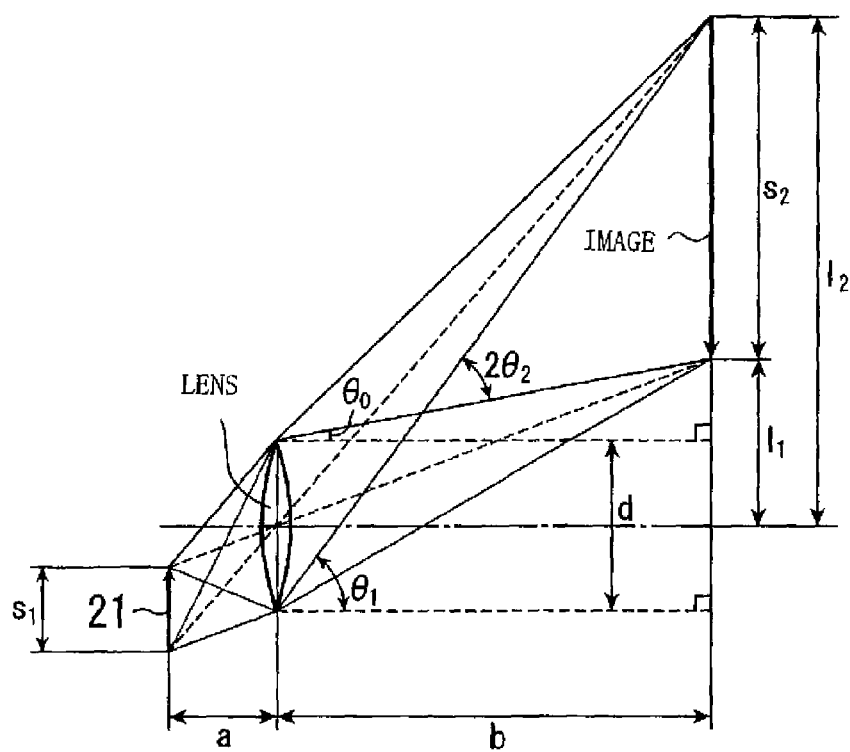
FIG. 27 is an explanatory drawing showing relation between the angle range corresponding to an NA and the diameter of a lens, the focal length, the imaging magnification, and the imaging position.

Assuming that a light emitted from an object (for example, an image display panel such as a liquid crystal or a DMD or the like in the projection display) 21 having a length of $S_1$ placed at a distance "a" behind a lens of "d" in diameter and "f" in focal length as shown in FIG. 27 passes through the lens and forms an image at a distance "b" which satisfies the expression 1/a+1/b=1/f in front of the lens, the length $S_2$ of the image satisfies the expression $S_2/S_1$=b/a, and assuming that the distances from the center axis of the lens to the lower end and the upper end of the image are $l_1$, $l_2$ respectively, and the angles formed by straight lines connecting between the upper end of the lens and the lower end of the image, and between the lower end of the lens and the upper end of the image with respect to the center axis of the lens are $\theta_0$, $\theta_1$ respectively, the angular range $2\theta_2$ corresponding to the NA is represented by the following expression.

$$2\theta_2 = \theta_1 - \theta_0 \quad (0\text{-}1)$$

$$\tan \theta_1 = (l_2 + d/2)/b \quad (0\text{-}2)$$

$$\tan \theta_0 = (l_1 - d/2)/b \quad (0\text{-}3)$$

If all the light in the angular range $2\theta_2$ cannot be bent in the curved optical waveguides (hereinafter, referred to as bent waveguides), the usage efficiency of the screen light is lowered. In addition, the light leaked from the bent waveguides is led to lowering of the resolution of the image. Therefore, matching between the angular range $2\theta_2$ of the input light beam from behind the screen and the angular range corresponding to the NA of the bent waveguides is very important in terms of design of the optical system for projection display system.

Therefore, the theoretical derivation of the NA of the bent waveguides will be described in detail below.

[NA of the Bent Waveguides of the Step Index Type]

Figure 28:
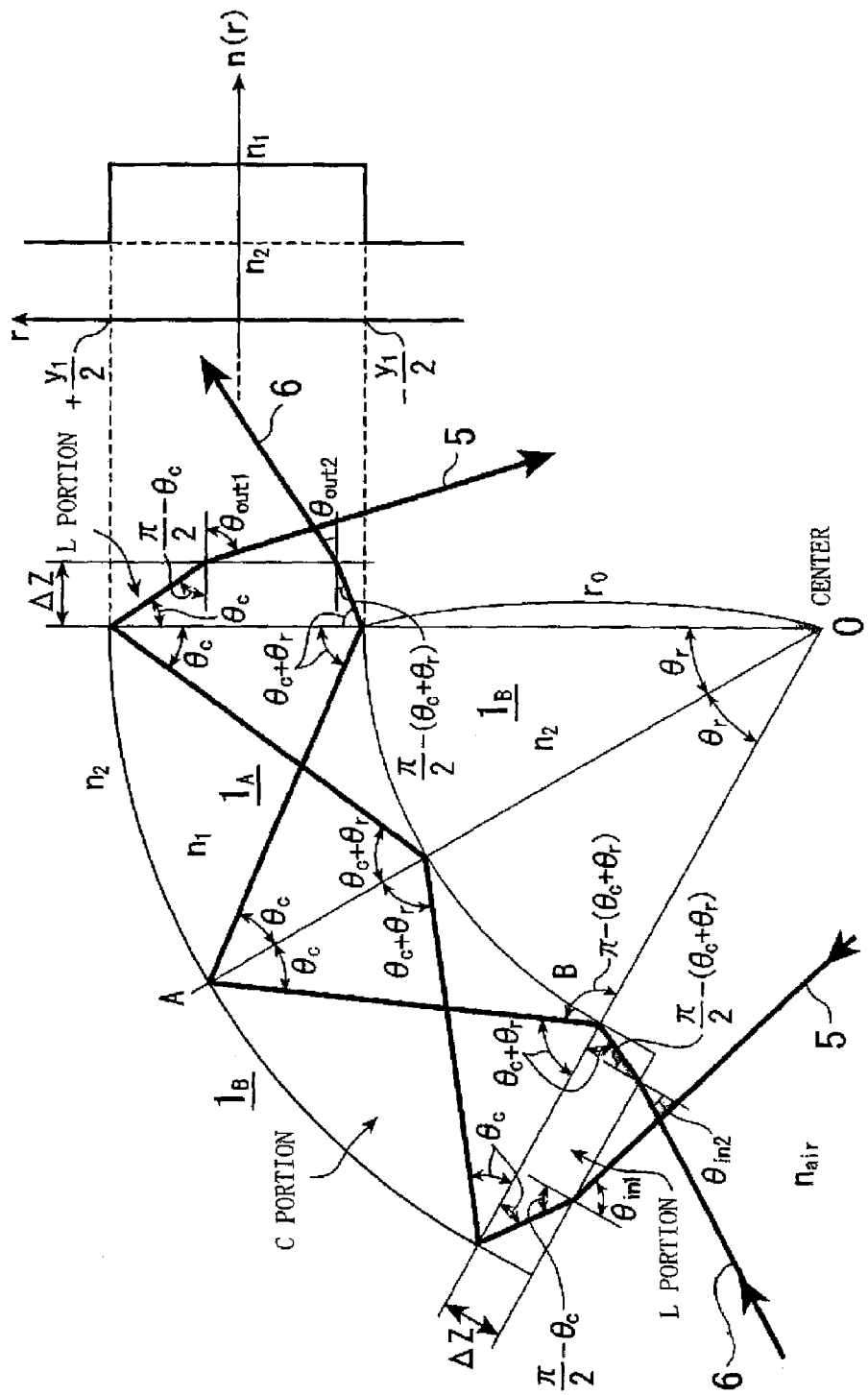
FIG. 28 is an explanatory drawing showing a step index optical waveguide bent structure model.

FIG. 28 shows a curved structure model of the step index type optical waveguide. It has a structure in which the layers (core) $1_A$ having the refractive index $n_1$ which constitute bent waveguides and the layers (clad) $1_B$ having a refractive index $n_2$ which is smaller than $n_1$ are alternately layered. The core $1_A$ is assumed to have the thickness $y_1$, the center of curvature O, and the radius of curvature $r_0$ of the interface surface on the inner peripheral side. In this model, in order to make the NAs of the input and output easy to understand, linear structures (L portions) of minute length Δz are added to an entrance and an exit of a bent structure (C portion) of the optical waveguides. The external portion of the optical waveguide is an air layer having a refractive index $n_{air}$.

The light beams 5, 6 are in modes which can be propagated in the core $1_A$ of the C portion. These two modes are modes which are propagated by being totally reflected at a critical angle $\theta_C$ on an interface of the core $1_A$ of the C portion with respect to the clad $1_B$ on the outer peripheral side (outer interface), and at $\theta_C+\theta_r$ on an interface of the core $1_A$ of the C portion with respect to the clad $1_B$ on the inner peripheral side (inner interface). A light beam 5 is propagated by being totally reflected at the critical angle $\theta_C$ on the outer interface at the entrance and the exit of the C portion, and a light beam 6 is propagated by being totally reflected at a critical angle of $\theta_C+\theta_r$ on the inner interface at the entrance and the exit of the C portion.

When the light beam 5 is totally reflected at the entrance and the exit of the outer interface exactly at the critical angle, outgoing angles into the air layer are $\theta_{in1}$ and $\theta_{out1}$ in the drawing. When the position is slightly shifted, since the total reflection is not effected exactly at the entrance and the exit, the angles are $-\theta_{in1}$ and $-\theta_{out1}$. Therefore, the NA of the mode of the light beam 5 is determined by $\pm\theta_{in1}$ and $\pm\theta_{out1}$. When the same discussion is made for the mode of the light beam 6, it can be said that the NA of the mode is determined by $\pm\theta_{in2}$ and $\pm\theta_{out2}$.

We now focus attention on the light beam 5. Although the drawing shows a light beam incoming at an angle of $+\theta_{in1}$, a light entering into the entrance on the outer interface at an angle of $-\theta_{in1}$ is considered ($\Delta z$ is infinitely small). The light entering into the entrance on the outer interface can be propagated in the core of the C portion. However, when the incoming position is moved from the outer interface to the inner interface, the light beam is totally reflected at the critical angle $\theta_C$ on the inner interface, and when it reaches the outer interface, it enters into the outer interface at an angle smaller than the critical angle $\theta_C$, and hence the light does not totally reflect and refract into the clad. Therefore, in the case of the light beam 5, although the NA on the outer interface at the entrance and the exit are determined by $\pm\theta_{in1}$ and $\pm\theta_{out1}$, the NA is reduced as it approaches the inner periphery, and at the position on the inner interface, they coincide with the angles $\pm\theta_{in2}$ and $\pm\theta_{out2}$ which determine the NA of the light beam 6. Therefore, it can be said that the NA that allows safe propagation through the waveguides of curved structure is determined by the angles $\pm\theta_{in2}$ and $\pm\theta_{out2}$ of the light beam 6. Therefore, the design of the screen is discussed by these angles.

Subsequently, referring to FIG. 28, these angles $\pm\theta_{in2}$ and $\pm\theta_{out2}$ will be derived. A sine theorem is applied to a triangle OAB in FIG. 28; The following expression is obtained.

$$r_0/\sin\theta_C = (r_0+y_1)/\sin\{\pi-(\theta_C+\theta_r)\} \qquad (1\text{-}1)$$

Since $\theta_C$ is the critical angle, using the refractive indexes $n_1$, $n_2$ of the core and the clad, the following expression is obtained.

$$\theta_C = \sin^{-1}(n_2/n_1) \qquad (1\text{-}2)$$

From the expressions (1-1), (1-2), the following expression is obtained.

$$\theta_C+\theta_r = \sin^{-1}\{(n_2/n_1)\times(1+y_1/r_0)\} \qquad (1\text{-}3)$$

Therefore, Snell's Law of the following expression is established for the interface between the air layer and the optical waveguide wherein the light beam 6 is totally reflected at the point B.

$$n_{air}\times\sin\theta_{in2} = n_1\times\sin\{\pi/2-(\theta_C+\theta_r)\} \qquad (1\text{-}4)$$

From the expressions (1-2), (1-4), $\theta_{in2}(=\theta_{out2})$ are given by the following expression.

$$\theta_{in2} = \theta_{out2} = \sin^{-1}[(n_1/n_{air})\times\cos\{\sin^{-1}((n_2/n_1)\times(1+y_1/r_0))\}] \qquad (1\text{-}5)$$

Therefore, the input/output angle $\theta_{NAstep}$ with respect to the optical axis of the light which allows safe propagation without depending on the input position in the curved structure model of the step index optical waveguide shown in FIG. 28 is given by the following expression from the expression (1-5).

$$-\theta_{in2}(=-\theta_{out2}) \leq \theta_{NAstep} \leq +\theta_{in2}(=+\theta_{out2}) \qquad (1\text{-}6)$$

Figure 29:
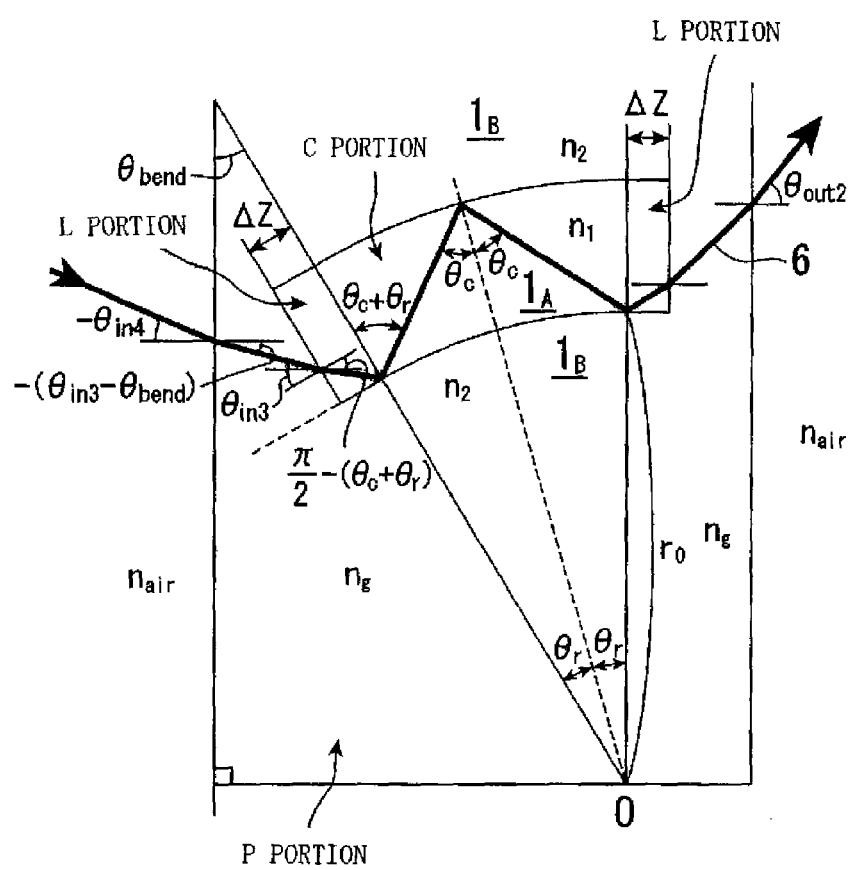
FIG. 29 is an explanatory drawing showing a step index optical waveguide bent structure model.
Figure 30:
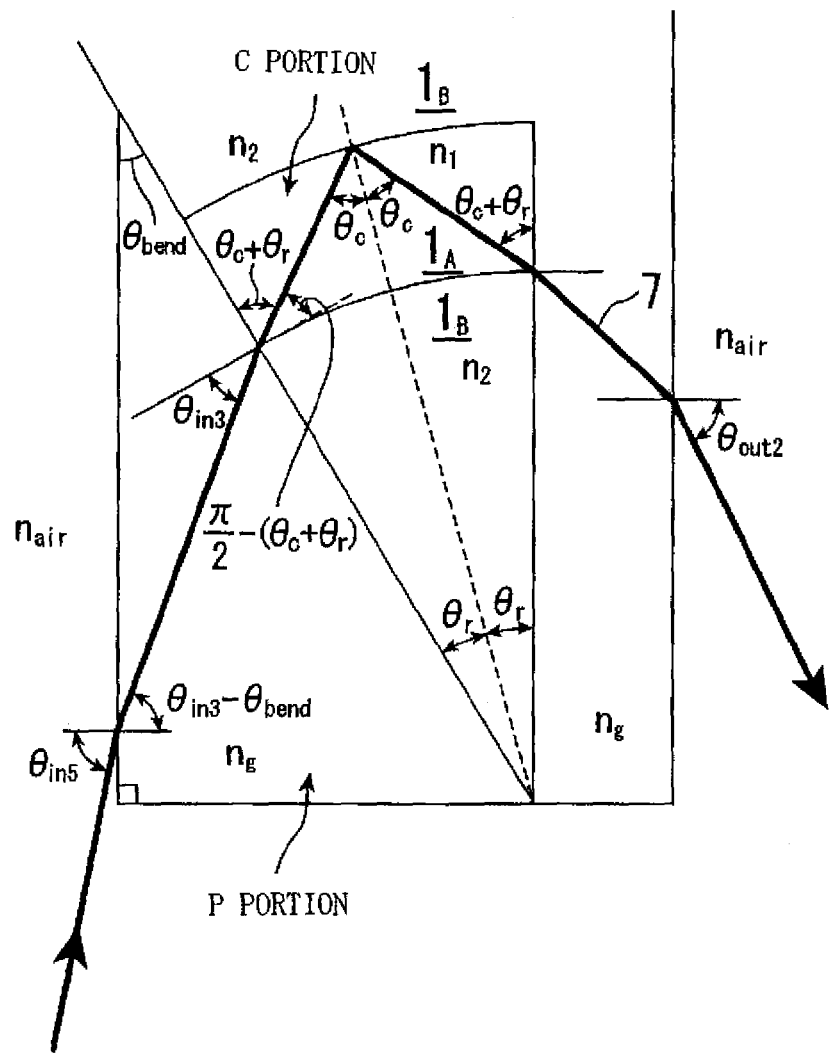
FIG. 30 is an explanatory drawing showing a step index optical waveguide bent structure model.
Figure 31:
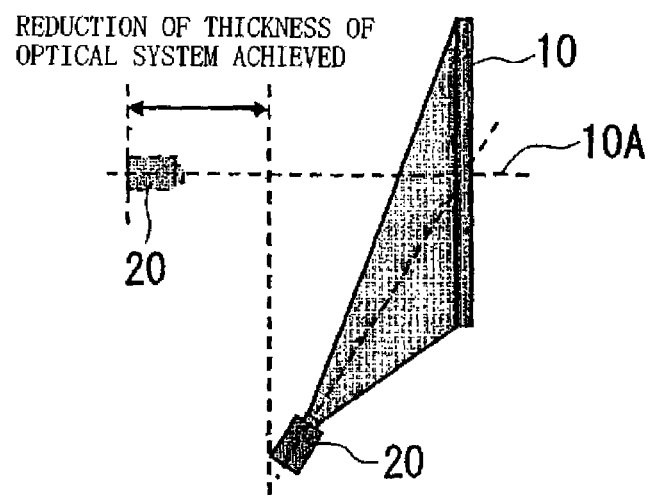
FIG. 31 is an explanatory drawing showing reduction of the thickness of the optical system employing projection display system.

Subsequently, an NA in the case where the model shown in FIG. 28 is formed in the film having a refractive index $n_g$ is obtained. Since the output side is perpendicular to the film plane, the NA whose output angle is $\pm\theta_{out2}$ in the expression (1-5) is obtained. On the input side, a prism (P portion) having the refractive index $n_g$, which corresponds to the remaining portion $2_X$ in FIG. 23, FIG. 25, and FIG. 26 is added. Such a state is shown in FIG. 29 and FIG. 30. The light beam 6 which is totally reflected on the inner interface at the entrance and the exit of the C portion is shown in FIG. 29, and a light beam 7 which is not totally reflected is shown in FIG. 30. For the sake of easy understanding, L portions of $\Delta z$ in length are added to the entrance and the exit of the C portion in FIG. 29. Actually, it may be considered as $\Delta z \rightarrow 0$.

The $\theta_{in4}$ in FIG. 29 is obtained in the following expression, by applying Snell's Law on the interface between the air layer and the P portion as regards the light beam 6.

$$n_{air}\times\sin(-\theta_{in4}) = n_g\times\sin(\theta_{bend}-\theta_{in3}) \qquad (1\text{-}7)$$

Since $\theta_{in3}$ corresponds to $\theta_{in2}$ in the case in which $n_{air}$ is replaced by $n_g$ in FIG. 28, by changing the $n_{air}$ into $n_g$ in the expression (1-5), the following expression is obtained.

$$\theta_{in3} = \sin^{-1}[(n_1/n_g)\times\cos(\sin^{-1}((n_2/n_1)\times(1+y_1/r_0)))] \qquad (1\text{-}8)$$

From the expressions (1-7), (1-8), $$-\theta_{in4} = \sin^{-1}[(n_g/n_{air})\times\sin\{-\sin^{-1}((n_1/n_g)\times\cos(\sin^{-1}((n_2/n_1)\times(1+y_1/r_0))))+\theta_{bend}\}] \qquad (1\text{-}9)$$

is obtained.

Subsequently, $\theta_{in5}$ in FIG. 30 will be obtained. This can be obtained simply by changing the sign before $\theta_{bend}$ in the expressions (1-7) and (1-9), the following two expressions are established with corresponding to the expressions (1-7) and (1-9).

$$n_{air}\times\sin(-\theta_{in5}) = n_g\times\sin(\theta_{bend}-\theta_{in3}) \qquad (1\text{-}10)$$

$$\theta_{in5} = \sin^{-1}[(n_g/n_{air})\times\sin\{\sin^{-1}((n_1/n_g)\times\cos(\sin^{-1}((n_2/n_1)\times(1+y_1/r_0))))+\theta_{bend}\}] \qquad (1\text{-}11)$$

Therefore, from the description above, the angle $\theta_{NAstepin}$ which determines the NA on the incident side of the film as the curved structure model of the step index optical waveguide and the angle $\theta_{NAstepout}$ which determines the NA on the outgoing side thereof are given by the following two expressions.

$$\theta_{in4} \leq \theta_{NAstepin} \leq \theta_{in5} \qquad (1\text{-}12)$$

$$-\theta_{out2} \leq \theta_{NAstepout} \leq \theta_{out2} \qquad (1\text{-}13)$$

On the other hand, from FIG. 29 and FIG. 30, since $-\theta_{in4} \geq -90°$, $\theta_{in5} \leq 90°$, from the expressions (1-9), (1-11), conditions of the layer inclination angle on the incident side $\theta_{bend}$ (hereinafter, represented as $\theta_{bend\text{-}in}$) are represented by the following expression.

$$|\theta_{bend\text{-}in}| \leq -\sin^{-1}[(n_1/n_g)\times\cos\{\sin^{-1}((n_2/n_1)\times(2\times R_{in}+y_1)/(2\times R_{in}-y_1))\}]+\sin^{-1}(n_{air}/n_g) \qquad (1\text{-}14)$$

where $R_{in}$ represents a radius of curvature at the center portion of the core thickness near the incoming surface ($=r_0+y_1/2$).

In FIG. 28, if $|\theta_C+\theta_r| > \pi/2$, since the light beam 5 cannot totally reflect on the inner interface, $|\theta_C+\theta_r| \leq \pi/2$ is a prerequisite of the model, and from this condition and the expression (1-3), $r_0 \leq n_2/(n_1-n_2)\times y_1$. Therefore, the radius of curvature at the center portion of the core thickness of the curved waveguide must be at least a minimum radius of curvature $R_{minstep}$ which is given by the following expression.

$$R_{minstep}=n_2/(n_1-n_2)\times y_1+y_1/2=(n_1+n_2)/(n_1-n_2)\times(y_1/2) \quad (1\text{-}16)$$

From the description above, in the case of the bent waveguides of the step index type, a light entered into the bent waveguides at a certain incoming angle within the incoming angular range ($\theta_{in-min}$ to $\theta_{in-max}$) is gradually changed in its direction of propagation in the bent waveguides and goes out at a certain outgoing angle within the outgoing angular range ($\theta_{out-min}$ to $\theta_{out-max}$). $\theta_{in-min}$, $\theta_{in-max}$, $\theta_{out-min}$, $\theta_{out-max}$ are given by the following expressions.

[Expression 4]

$$\theta_{in-min} = \quad (1\text{-}17)$$
$$\sin^{-1}\left[\frac{n_g}{n_{air}}\sin\left\{-\sin^{-1}\left(\frac{n_1}{n_g}\cos\left(\sin^{-1}\left(\frac{n_2}{n_1}\cdot\frac{2R_{in}+y_1}{2R_{in}-y_1}\right)\right)\right)+\theta_{bend-in}\right\}\right]$$

$$\theta_{in-max} = \quad (1\text{-}18)$$
$$\sin^{-1}\left[\frac{n_g}{n_{air}}\sin\left\{\sin^{-1}\left(\frac{n_1}{n_g}\cos\left(\sin^{-1}\left(\frac{n_2}{n_1}\cdot\frac{2R_{in}+y_1}{2R_{in}-y_1}\right)\right)\right)+\theta_{bend-in}\right\}\right]$$

$$\theta_{out-min} = \sin^{-1} \quad (1\text{-}19)$$
$$\left[\frac{n_g}{n_{air}}\sin\left\{-\sin^{-1}\left(\frac{n_1}{n_g}\cos\left(\sin^{-1}\left(\frac{n_2}{n_1}\cdot\frac{2R_{out}+y_1}{2R_{out}-y_1}\right)\right)\right)+\theta_{bend-out}\right\}\right]$$

$$\theta_{out-max} = \quad (1\text{-}20)$$
$$\sin^{-1}\left[\frac{n_g}{n_{air}}\sin\left\{\sin^{-1}\left(\frac{n_1}{n_g}\cos\left(\sin^{-1}\left(\frac{n_2}{n_1}\cdot\frac{2R_{out}+y_1}{2R_{out}-y_1}\right)\right)\right)+\theta_{bend-out}\right\}\right]$$

In the models shown in FIG. 28 to FIG. 30, the layer interface from the entrance to the exit of the waveguides for all the optical paths are curved lines having no abrupt change in angle. In this case, the incoming light is not diffused, and only the outgoing direction is converted. On the other hand, according to the present invention, the layer interface can be adapted to be a curved line whose angle is abruptly changed. In this case, the direction of reflection of the incoming light may be changed in the layer, so that the incoming light can be diffused while being changed in direction of travel. In the present invention, the phrase "the radius of curvature is fluctuated from point to point to diffuse the incoming light" unless otherwise specified indicates the case in which the layer inclination angle is a curved line whose angle is abruptly changed, and the term "abrupt change in the layer inclination angle" means the change in layer inclination angle at least 0.01 deg./μm.

[NA of the Bent Waveguides of the Gradient Index Type]

According to the theoretical analysis of the inventors, when the curved line of the bent waveguides of the gradient index type is approximated by a polygonal line, the error of the radius of curvature by the approximation is as small as 1.3% when the refractive index at the center portion of the width (layer thickness) of the bent waveguides is 1.55, which is close to a core value of the general optical waveguides. Therefore, in the description below, the NA is derived by the polygonal approximation model.

Figure 34:
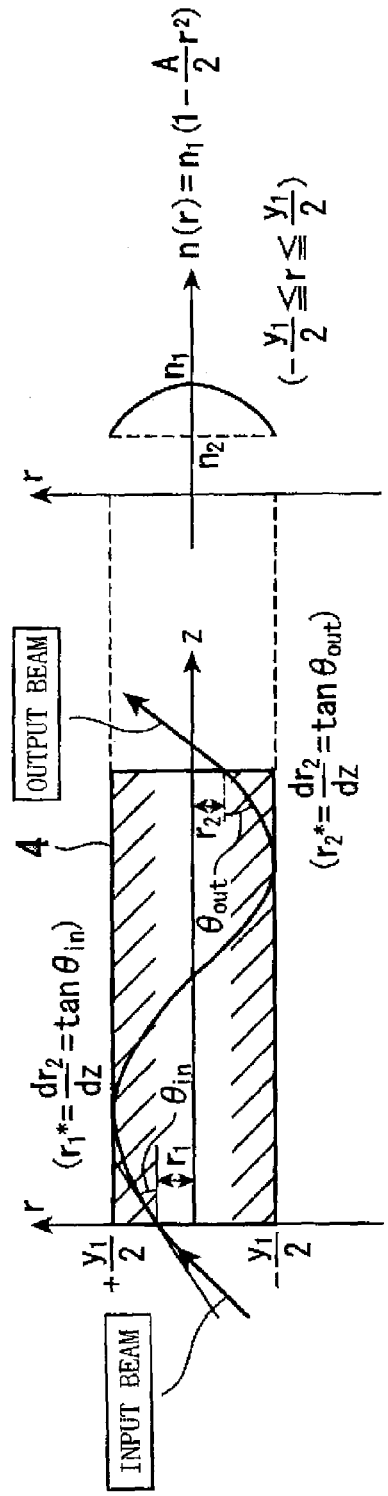
FIG. 34 is an explanatory drawing of a definition of a linear gradient index optical waveguide.

The linear portion in the polygonal approximation model is a linear gradient index optical waveguide 4, whose distribution of the refractive indexes in the direction of the layer thickness as shown in FIG. 34 is represented by a curve of second order:

$$n(r)=n_1\times(1-A/2\times r^2) \quad (2\text{-}1)$$

where r represents a distance from the center of the layer thickness, and $n_1$ represents a refractive index on the center axis. A represents a refractive index distribution constant, and is represented by $$A=(8/y_1^2)\times(n_1-n_2)/n_1 \quad (2\text{-}2)$$

by $n_1$, the layer thickness $y_1$, and the refractive index $n_2$ at the end of the layer thickness.

As shown in the drawings, assuming that the length of the waveguide is z, positions of the input light beam and the output light beam are $r_1$, $r_2$, directions of the light beam within the waveguide at the respective positions are $r_1^*=dr_1/dz=\tan\theta_{in}$, $r_2^*=dr_2/dz=\tan\theta_{out}$, the following expression (2-3) is established between vectors $[r_1, r_1^*]$, $[r_2, r_2^*]$ representing the position and the direction of the input light beam and output light beam.

[Expression 5]

$$\begin{bmatrix}r_2\\r_2^*\end{bmatrix}=\begin{bmatrix}\cos(\sqrt{A}z) & \dfrac{\sin(\sqrt{A}z)}{n_1\sqrt{A}}\\-n_1\sqrt{A}\sin(\sqrt{A}z) & \cos(\sqrt{A}z)\end{bmatrix}\begin{bmatrix}r_1\\r_1^*\end{bmatrix} \quad (2\text{-}3)$$

In the expression (2-3), if the matrix term of 2×2 is a unit matrix, the [position, direction] vector is the same between the input light beam and the output light beam. The minimum solution of the length z at this time is referred to as a pitch P of the waveguide, and factors of the matrix term are functions of sine and cosine. Therefore, the expression $$P=2\times\pi/\sqrt{A} \quad (2\text{-}4)$$

is established.

Figure 35:
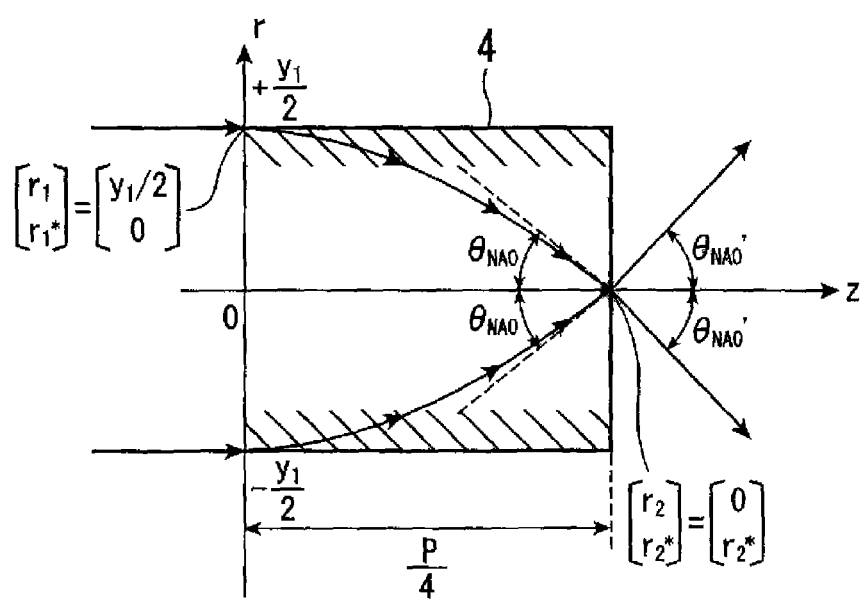
FIG. 35 is an explanatory drawing showing derivation of an angle which determines the NA in the linear gradient index optical waveguide.

The angle that determines the NA of the linear gradient index optical waveguide is given by the largest angle out of the angle between the light beam that can be propagated in the waveguide and the optical axis (z-axis). As shown in FIG. 35, the largest angle corresponds to the angle $\theta_{NA0}$ between the output light beam and the optical axis (negative when $y_1$ is + and positive when $y_1$ is −) in the case where the length of the waveguide is P/4, and the [position, direction] vectors of the input light beam and the output light beam are $[\pm y_1/2, 0]$, $[0, r_2^*]$. The angle $\theta_{NA0}$ is obtained by substituting 0 for $r_2$, $-y_1/2$ for $r_1$, 0 for $r_1^*$, and $P/4=\pi/(2\times\sqrt{A})$ for z into the expression (2-3), and obtaining the value $r_2^*(=\tan\theta_{NA0})$, which is represented by the expression;

$$\theta_{NA0}=\tan^{-1}(n_1\times\sqrt{A}\times y_1/2) \quad (2\text{-}5)$$

Figure 36:
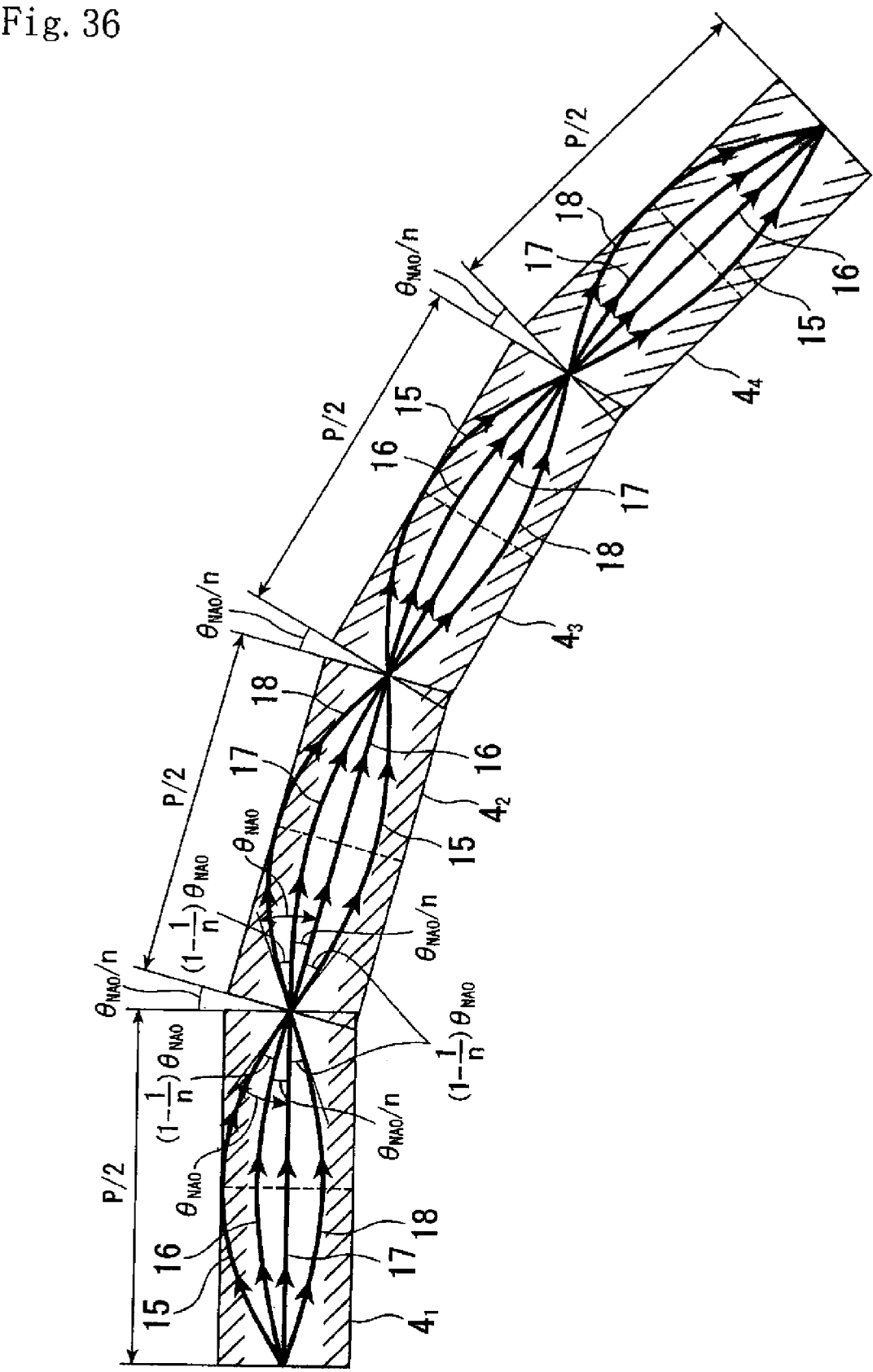
FIG. 36 is an explanatory drawing showing a polygonal approximation model of a bent waveguide of a gradient index type.

FIG. 36 shows a polygonal approximation model. This is an approximation of the bent waveguide of the gradient index type obtained by the optical waveguides of a polygonal gradient index type in which a structure such that the above-described linear gradient index optical waveguide is bent by an angle $\theta_{NA0}/n$ (n is a real number equal to or larger than 0.5) at a position of the length P/2, and then by an angle $\theta_{NA0}/n$ at a position proceeded by P/2 in the direction of the optical axis is repeated. Light beams 15, 16, 17, 18 in the drawing indicate modes of the representative light beam which can be propagated in the polygonal optical waveguide. When n is smaller than 0.5, since the light goes out from the waveguide, it is excluded from the object of the model.

The light beam 17 is a light incoming in parallel with the optical axis of the first linear gradient index optical waveguide 4₁ (hereinafter, referred to as the optical waveguide 4₁) to a position of the optical axis, and this light travels straight ahead in the optical waveguide 4₁, and then enters into the second linear gradient index optical waveguide 4₂ (hereinafter, referred to as the optical waveguide 4₂) which is inclined by $-\theta_{NA0}/n$ at a position advanced by P/2. Therefore, the incident angle into the optical waveguide 4₂ is $\theta_{NA0}/n$. Since the lengths of the respective linear gradient index optical waveguides are P/2, the outgoing angle of the optical waveguide 4₂ is $-\theta_{NA0}/n$ with respect to the optical axis of the optical waveguide 4₂. Since the third linear gradient index optical waveguide 4₃ (hereinafter, referred to as the optical waveguide 4₃) is inclined by $-\theta_{NA0}/n$ with respect to the second optical waveguide 4₂, the incident angle of the light beam 17 is 0°, and hence the light beam 17 travels straight ahead in the linear gradient index optical waveguide of the odd number sequence, and changes the direction of travel and curved from the incident angle: $+\theta_{NA0}/n$ to the outgoing angle: $-\theta_{NA0}/n$ in the linear gradient index optical waveguide of the even number sequence. On the other hand, the light beam 16 shows a mode in which the state in the linear gradient index optical waveguides of the odd number sequence and the even number sequence of the light beam 17 are exchanged.

The light beams which determine the NA of the polygonal gradient index optical waveguide are the light beam 15 and the light beam 18.

The light beam 15 is a light beam of the maximum possible incident angle which can be propagated in the optical waveguide 4₁. Therefore, the incident angle into the waveguide of the optical waveguide 4₁ is $\theta_{NA0}$. Since the lengths of the respective linear gradient index optical waveguides are P/2, the outgoing angle of the light beam 15 from the optical waveguide 4₁ is $-\theta_{NA0}$. Since the optical waveguide 4₂ is inclined by $-\theta_{NA0}/n$ with respect to the optical waveguide 4₁, the incoming angle of the light beam 15 with respect to the optical axis of the optical waveguide 4₂ is $-(1-1/n)\times\theta_{NA0}$. Since the absolute value of the incident angle: $|(1-1/n)\times\theta_{NA0}|$ is smaller than $\theta_{NA0}$, the light beam 15 can be propagated within the optical waveguide 4₂. Since the length of the optical waveguide 4₂ is also P/2, the outgoing angle with respect to the optical axis of the optical waveguide 4₂ is $(1-1/n)\times\theta_{NA0}$. Since the optical waveguide 4₃ of the next sequence is inclined by $-\theta_{NA0}/n$ with respect to the optical waveguide 4₂, the incident angle of the light beam 15 with respect to the optical waveguide 4₃ is $\theta_{NA0}$, which is the same light propagation state in the optical waveguide 4₁. Therefore, the light beam 15 is a mode in which the direction is changed from the incident angle: $\theta_{NA0}$ to the outgoing angle: $-\theta_{NA0}$ in the linear gradient index optical waveguide of the odd number sequence, and from the incident angle: $-(1-1/n)\times\theta_{NA0}$ to the outgoing angle: $(1-1/n)\times\theta_{NA0}$ in the linear gradient index optical waveguide of the even number sequence, before propagation. In other words, the mode shown in conjunction with the light beam 15 is a mode of the maximum possible incident angle which can be propagated within the linear gradient index optical waveguide of the odd number sequence. On the other hand, the light beam 18 represents a mode in which the state in the linear gradient index optical waveguides of the odd number sequence and the even number sequence of the light beam 15 are exchanged. Therefore, the NA of the polygonal gradient index optical waveguide is determined by an angle between the incident angle and the outgoing angle of the light beam 15 and by an angle between the incident angle and the outgoing angle of the light beam 18.

Subsequently, the NA will be obtained. Assuming that the number of the linear gradient index optical waveguides which constitute the polygonal model is a natural number k, an optical axis of the $k^{th}$ linear gradient index optical waveguide is bent by an angle $\theta_{bend}$, which is represented by the following expression, with respect to that of the first linear gradient index optical waveguide.

$$\theta_{bend}=-(k-1)\times\theta_{NA0}/n \quad (2\text{-}6)$$

The angle $\theta_{NA0}(k)$ which determines the NA of the outgoing side in the $k^{th}$ linear gradient index optical waveguide is given by following expression, from FIG. 36, $$\theta_{bend}-\theta_{NA0}\leq\theta_{NA0}(k)\leq\theta_{bend}+(1-1/n)\times\theta_{NA0} \quad (2\text{-}7)$$

and the following expression is obtained by substituting the expression (2-6) into about expression (2-7).

$$-\theta_{NA0}/n\times(k+n-1)\leq\theta_{NA0}(k)\leq-\theta_{NA0}/n\times(k-n) \quad (2\text{-}8)$$

Since the natural number k exists in the angle represented by the expressions (2-6), (2-7), and (2-8), it is a discrete angle definition. However, the polygonal approximation model in FIG. 36 is an approximation of the bent waveguide existing in the actual film. Therefore, even when the entire model is continuously rotated about the center of the curvature of the polygonal approximation model in FIG. 36, the NA of the model does not change, and the NA is determined by the radius of curvature and the refractive index distribution function n(r) represented by the expression (2-1).

Therefore, $\theta_{bend}$ in the expression (2-7) can be treated as a continuous value, not as a discrete value. An angle $\theta_{NA1}$ which determines the NA in the optical waveguide of the polygonal approximation model in the case where the $\theta_{bend}$ is treated as the continuous value is given by the following expression.

$$\theta_{bend}-\theta_{NA0}\leq\theta_{NA1}\leq\theta_{bend}+(1-1/n)\times\theta_{NA0} \quad (2\text{-}9)$$

Figure 37:
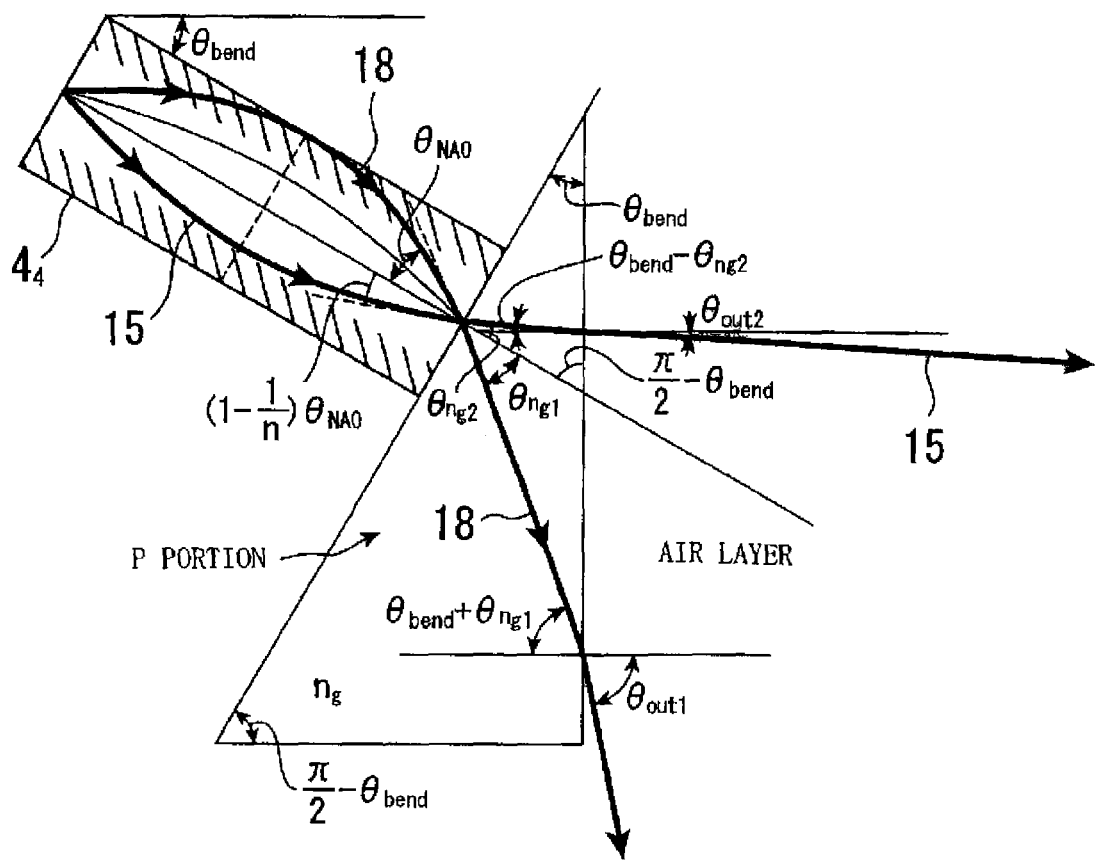
FIG. 37 is an explanatory drawing showing a state in which the model in FIG. 36 is formed in the film.

When the model in FIG. 36 is formed in the film, as shown in FIG. 37, the prism (P portion) having a refractive index $n_g$ and apex angle $\theta_{bend}$ which correspond to the remaining portion $2_X$ in FIG. 23, FIG. 25, and FIG. 26 are added to the outgoing portion on the right side.

When Snell's Law is applied to the interface between the outgoing end of the waveguide 4₄ and the P portion and the interface between the P portion and the air layer (refractive index: $n_{air}$) for the light beam 18, the following expressions (2-10) and (2-11) are obtained respectively.

$$n_1\times\sin\theta_{NA0}=n_g\times\sin\theta_{ng1} \quad (2\text{-}10)$$

$$n_g\times\sin(\theta_{bend}+\theta_{ng1})=n_{air}\times\sin\theta_{out1} \quad (2\text{-}11)$$

From the expressions (2-10), (2-11), the $\theta_{out1}$ is obtained by the following expression.

$$\theta_{out1}=\sin^{-1}[n_g/n_{air}\times\sin\{\theta_{bend}+\sin^{-1}(n_1/n_g\times\sin\theta_{NA0})\}] \quad (2\text{-}12)$$

When performing the same analysis for the light beam 15, the following two expressions are established.

$$n_1\times\sin\{(1-1/n)\times\theta_{NA0}\}=n_g\times\sin\theta_{ng2} \quad (2\text{-}13)$$

$$n_g\times\sin(\theta_{bend}-\theta_{ng2})=n_{air}\times\sin\theta_{out2} \quad (2\text{-}14)$$

From the expressions (2-13) and (2-14), $\theta_{out2}$ is given by the following expression.

$$\theta_{out2}=\sin^{-1}[n_g/n_{air}\times\sin\{\theta_{bend}-\sin^{-1}(n_1/n_g\times\sin((1-1/n)\times\theta_{NA0}))\}] \quad (2\text{-}15)$$

From the expressions (2-12) and (2-15), the NA on the outgoing side is determined by the following $\theta_{NAout}$.

$$-\theta_{out2}\leq\theta_{NAout}\leq-\theta_{NAout} \quad (2\text{-}16)$$

The NA on the incident side is $\theta_{bend}=0°$ in the expressions (2-12) and (2-15), and when $\theta_{out1}$ in the expression (2-12) is changed into $\theta_{in1}$, and $\theta_{out2}$ in the expression (2-15) is changed into $\theta_{in2}$, the following two expressions are established.

$$\theta_{in1}=\sin^{-1}(n_1/n_{air}\times\sin\theta_{NA0}) \quad (2\text{-}17)$$

$$\theta_{in2}=\sin^{-1}\{n_1/n_{air}\times-\sin((1-1/n)\times\theta_{NA0})\} \quad (2\text{-}18)$$

From the expressions (2-12) and (2-15), the NA on the incident side is determined by $\theta_{NAin}$ in the following expression.

$$\theta_{in2}\leq\theta_{NAin}\leq\theta_{in1} \quad (2\text{-}19)$$

In the model shown in FIG. 36, although the input and output angles of the light are opposite to the case of the rear projection display system in FIG. 22, by changing the lower case "out" attached to the angle θ in the expressions (2-12), (2-15) and (2-16) into "in", the following three expressions in which the angle on the incident side matches the system in FIG. 22 are established.

$$\theta_{in1}=\sin^{-1}[n_g/n_{air}\times\sin\{\theta_{bend}+\sin^{-1}(n_1/n_g\times\sin\theta_{NA0})\}] \quad (2\text{-}12\text{A})$$

$$\theta_{in2}=\sin^{-1}[n_g/n_{air}\times\sin\{\theta_{bend}-\sin^{-1}(n_1/n_g\times\sin((1-1/n)\times\theta_{NA0}))\}] \quad (2\text{-}15\text{A})$$

$$\theta_{in2}\leq\theta_{NAin}\leq\theta_{in1} \quad (2\text{-}16\text{A})$$

On the outgoing side, the following three expressions which match the system in FIG. 22 are established from the expressions (2-17), (2-18) and (2-19).

$$\theta_{out1}=-\sin^{-1}(n_1/n_{air}\times\sin\theta_{NA0}) \quad (2\text{-}17\text{A})$$

$$\theta_{out2}=\sin^{-1}\{n_1/n_{air}\times\sin((1-1/n)\times\theta_{NA0})\} \quad (2\text{-}18\text{A})$$

$$\theta_{out1}\leq\theta_{NAout}\leq\theta_{out2} \quad (2\text{-}19\text{A})$$

The expression (2-19A) represents the fact that when the optical axis of the optical waveguide is bent to the direction of the normal line of the screen, the NA on the outgoing side becomes asymmetry. Therefore, subsequently, the angle $\theta_{axis}$ of the optical axis of the optical waveguide on the outgoing side for causing the NA to be symmetry on the upper side and lower side on the outgoing side is obtained by analysis.

Figure 38:
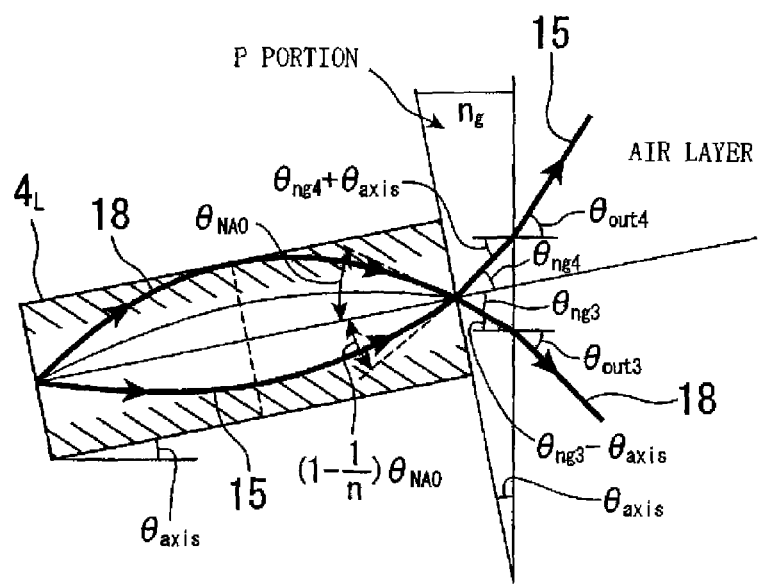
FIG. 38 is an explanatory drawing of an analysis of an angle of an optical axis that makes the NA symmetry on the upper side and the lower side on the outgoing side of the bent waveguide of the gradient index type.

FIG. 38 shows an end portion of the last optical waveguide (linear gradient index optical waveguide) $4_L$ on the outgoing side, which is ended by an angle $\theta_{axis}$ of optical axis. The output NA is determined by the angle between the light beams 15 and 18. Therefore, the value of $\theta_{axis}$ when $\theta_{out3}=\theta_{out4}$ is established in the drawing corresponds to the angle of the optical axis to be obtained.

$\theta_{out3}$ will be obtained by the expression (2-22) from the expression (2-20) which is established on the interface between the outgoing surface of the optical waveguide and the P portion and the expression (2-21) established on the interface between the P portion and the air layer for the light beam 18.

$$n_1\times\sin\theta_{NA0}=n_g\times\sin\theta_{ng3} \quad (2\text{-}20)$$

$$n_g\times\sin(\theta_{ng3}-\theta_{axis})=n_{air}\times\sin\theta_{out3} \quad (2\text{-}21)$$

$$\theta_{out3}=\sin^{-1}[n_g/n_{air}\times\sin\{\sin^{-1}(n_1/n_g\times\sin\theta_{NA0})-\theta_{axis}\}] \quad (2\text{-}22)$$

$\theta_{out4}$ is obtained from the expression (2-25) from the expression (2-23) established on the interface between the outgoing surface of the optical waveguide and the P portion and the expression (2-24) established on the interface between the P portion and the air layer for the light beam 15.

$$n_1\times\sin\{(1-1/n)\times\theta_{NA0}\}=n_g\times\sin\theta_{ng4} \quad (2\text{-}23)$$

$$n_g\times\sin(\theta_{ng4}+\theta_{axis})=n_{air}\times\sin\theta_{out4} \quad (2\text{-}24)$$

$$\theta_{out4}=\sin^{-1}[n_g/n_{air}\times\sin\{\sin^{-1}(n_1/n_g\times\sin((1-1/n)\times\theta_{NA0}))+\theta_{axis}\}] \quad (2\text{-}25)$$

Therefore, from the expressions (2-22)=(2-25), $\theta_{axis}$ to be obtained is given by the following expression.

$$\theta_{axis}=\frac{1}{2}\times[\sin^{-1}(n_1/n_g\times\sin\theta_{NA0})-\sin^{-1}(n_1/n_g\times\sin((1-1/n)\times\theta_{NA0}))] \quad (2\text{-}26)$$

An angle which determines the NA on the outgoing side under the establishment of the expression (2-26) can be obtained by the following expression, by substituting the expression (2-26) into the expression (2-22) or the expression (2-25), herein an angle to be obtained is $\theta'_{out3}=\theta'_{out4}$.

$$\theta'_{out3}=\theta'_{out4}=\sin^{-1}[n_g/n_{air}\times\sin\{\frac{1}{2}\times\sin^{-1}(n_1/n_g\times\sin((1-1/n)\times\theta_{NA0}))+\frac{1}{2}\times\sin^{-1}(n_1/n_g\times\sin\theta_{NA0})\}] \quad (2\text{-}27)$$

Therefore, from the expression (2-27), an angle which determines the NA on the outgoing side which is symmetry on the upper and lower sides is obtained by the following expression.

$$-\theta'_{out3}\leq\theta_{NAout}\leq\theta'_{out3} \quad (2\text{-}28)$$

Figure 39:
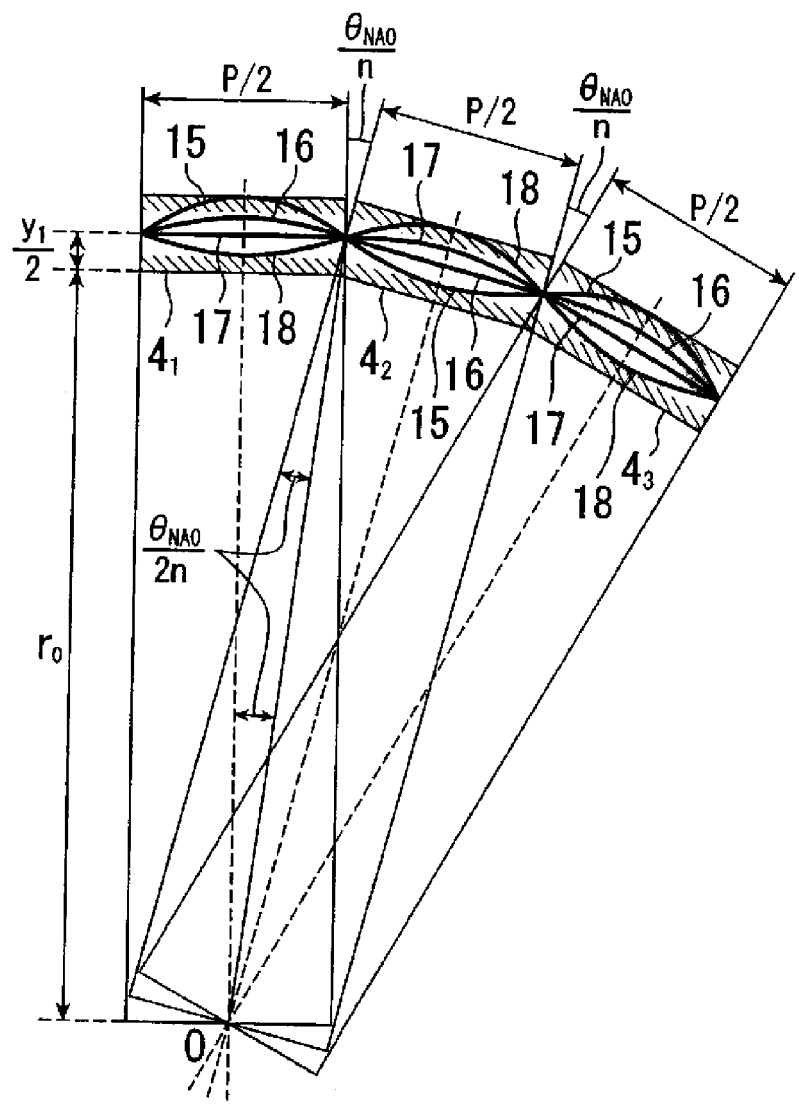
FIG. 39 is an explanatory drawing of a radius of curvature of a polygonal approximation model of the bent waveguide of the gradient index type.

Subsequently, the radius of curvature of this model is derived. As shown in FIG. 39, in this polygonal approximation model, the center of curvature is an intersection O of perpendicular bisectors of the respective segments having a length P/2 of the linear gradient index optical waveguides $4_1$, $4_2$, $4_3$, ..., and a radius of curvature R ($R=r_0+y_1/2$ from the same drawing) is a distance from the center of curvature O to the center points of the length and the thickness of the respective optical waveguides $4_1$, $4_2$, $4_3$, ... In the same drawing, when attention is focused on a right-angled triangle having the apex angle $\theta_{NA0}/(2\times n)$, the following expression is established.

$$\tan(\theta_{NA0}/(2\times n))=(P/4)/(r_0+y_1/2) \quad (2\text{-}29)$$

From the expression (2-29), the radius of curvature R is given by the following expression.

$$R=r_0+y_1/2=(P/4)/\tan(\theta_{NA0}/(2\times n)) \quad (2\text{-}30)$$

In other words, when $\theta_{NA0}$ and P of the linear gradient index optical waveguide which are of the polygonal approximation model are obtained, and n (real number equal to or larger than 0.5) that determines the bent angle (bending extent) is determined, the radius of curvature is determined by the expression (2-30). The minimum radius of curvature $R_{min}$ is obtained by the following expression, when n=0.5, and is given by an expression obtained by substituting 0.5 for n in the expression (2-30) and the expressions (2-4) and (2-5).

$$R_{min}=\pi/(n_1\times A\times y_1) \quad (2\text{-}31)$$

In this case, the error of the polygonal approximation model becomes the maximum value. On the other hand, although detailed description of the process of derivation is omitted, the minimum radius of curvature $R'_{min}$ of the optical waveguides of the gradient index type (curved structure model) having the same thickness and distribution of refractive index is given by the following expression.

$$R'_{min}=2/(A\times y_1) \quad (2\text{-}32)$$

From the expressions (2-31) and (2-32), an error factor between the $R'_{min}$ (corresponding to a rigorous solution) and the $R_{min}$ (corresponding to an approximated solution) is $\pi/(2\times$ $n_1$), and when 1.55, which is close to the core value of the general optical waveguide, is substituted for $n_1$, 1.0134 is obtained as the value of the error factor. Therefore, the error of the approximated solution with respect to the rigorous solution is within the 1.3% at the maximum, and hence the polygonal approximation model can be said to be sufficiently good approximation of the curved structure model.

Since the incident angle of the light is within the range between −90° and 90° with respect to the normal line to the film plane, $\theta_{in2} \geq -90°$ and $\theta_{in1} \leq 90°$ are established in the expression (2-16A). From these constraints and the expressions (2-12A) and (2-15A), a condition of the layer inclination angle near the incident surface $\theta_{bend-in}$ are expressed by the following expression using the radius of curvature of the layer near the incident surface $R_{in}$, the angle of propagation in the layer $\theta_{NA0}$, and the pitch P of the light propagation.

$$\theta_{bend-in-min} \leq \theta_{bend-in} \leq \theta_{bend-in-max} \quad (2\text{-}33)$$

$$\theta_{bend-in-min} = \sin^{-1}\{n_1/n_g \times \sin(\theta_{NA0} - 2\times\tan^{-1}(P/(4\times R_{in})))\} - \sin^{-1}(n_{air}/n_g) \quad (2\text{-}34)$$

$$\theta_{bent-in-max} = -\sin^{-1}(n_1/n_g \times \sin\theta_{NA0}) + \sin^{-1}(n_{air}/n_g) \quad (2\text{-}35)$$

Since the outgoing angle of the light is also within the range between −90° and 90° with respect to the normal line to the film plane, $\theta_{out2} \geq -90°$ and $\theta_{out1} \leq 90°$ are established in the expression (2-16). From these constraints and the expressions (2-12) and (2-15), a condition of the layer inclination angle near the outgoing surface $\theta_{bend-out}$ are expressed by the following expression using the radius of curvature of the layer near the outgoing surface $R_{out}$, the angle of propagation in the layer $\theta_{NA0}$, and the pitch P of the light propagation.

$$-\theta_{bend-out-min} \leq \theta_{bend-out} \leq \theta_{bend-out-max} \quad (2\text{-}36)$$

$$\theta_{bend-out-min} = \sin^{-1}\{n_1/n_g \times \sin(\theta_{NA0} - 2\times\tan^{-1}(P/(4\times R_{out})))\} - \sin^{-1}(n_{air}/n_g) \quad (2\text{-}37)$$

$$\theta_{bent-out-max} = -\sin^{-1}(n_1/n_g \times \sin\theta_{NA0}) + \sin^{-1}(n_{air}/n_g) \quad (2\text{-}38)$$

The lowest limit of the radius of curvature of the layer in the film is the value of the expression (2-32).

From the description above, in the bent waveguide of the gradient index type, the light incoming into the bent waveguide at a certain incident angle within the range of the incident angle ($\theta_{in-min}$ to $\theta_{in-max}$) is changed gradually in the direction of propagation within the bent waveguide, and goes out at a certain outgoing angle within the range of the outgoing angle ($\theta_{out-min}$ to $\theta_{out-max}$). The $\theta_{in-min}$, $\theta_{in-max}$, $\theta_{out-min}$, $\theta_{out-max}$ are given by the following expression.

[Expression 6]

$$\theta_{in-min} = \sin^{-1}\left[\frac{n_g}{n_{air}}\sin\left\{-\sin^{-1}\left(\frac{n_1}{n_g}\sin\left(\theta_{NA0} - 2\tan^{-1}\frac{P}{4R_{in}}\right)\right) + \theta_{bend-in}\right\}\right] \quad (2\text{-}39)$$

$$\theta_{in-max} = \sin^{-1}\left[\frac{n_g}{n_{air}}\sin\left\{\theta_{bend-in} + \sin^{-1}\left(\frac{n_1}{n_g}\sin\theta_{NA0}\right)\right\}\right] \quad (2\text{-}40)$$

$$\theta_{out-min} = \sin^{-1}\left[\frac{n_g}{n_{air}}\sin\left\{-\sin^{-1}\left(\frac{n_1}{n_g}\sin\left(\theta_{NA0} - 2\tan^{-1}\frac{P}{4R_{out}}\right)\right) + \theta_{bend-out}\right\}\right] \quad (2\text{-}41)$$

$$\theta_{out-max} = \sin^{-1}\left[\frac{n_g}{n_{air}}\sin\left\{\theta_{bend-out} + \sin^{-1}\left(\frac{n_1}{n_g}\sin\theta_{NA0}\right)\right\}\right] \quad (2\text{-}42)$$

In the models shown in FIGS. 34 to 39, it is assumed that the lengths of the plurality of layers are equivalent. In this case, the incident light is not diffused, and only the outgoing direction is converted. On the other hand, in the present invention, the lengths of the individual layers can be varied. In this case, by varying the outgoing direction of the light which goes out from the layer for each layer, the light can be diffused while converting the direction of conversion of the incident light.

Figure 40:
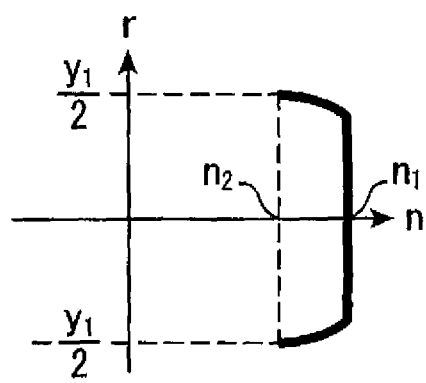
FIG. 40 is an explanatory drawing showing a distribution of refractive indexes which brings out a light-collecting property in the direction of the layer thickness other than the parabola type.

There may exist various types of the optical waveguide of the type having a distribution of refractive indexes which brings out a light-collecting property in the direction of the layer thickness other than those having a parabola-shaped distribution of refractive indexes as the gradient index type, such as those having a substantially trapezoidal distribution of refractive indexes as shown in FIG. 40. In any cases, as long as they can propagate the incident light within the layer, the same outgoing direction converting characteristics as in the case of the gradient index type can be obtained.

Here, the radius of curvature is not necessarily required to be constant from the entrance to the exit of the waveguide both for the step index type and the type having a distribution of refractive indexes which brings out a light-collecting property in the direction of the layer thickness. In the case of a gradual change such that the average inclination angle of the waveguide is less than 0.01 deg./μm as well, the same light outgoing direction converting effects can be obtained. In the case of an abrupt change such that the angle of layer inclination is 0.01 deg./μm or higher in the step index type, the light-outgoing direction converting/diffusing diffusion film of the step index type is obtained as described above. In the case in which the layer inclination angle is rapidly changed by 0.01 deg./μm or more in the type having a distribution of refractive indexes which brings out a light-collecting property in the direction of the layer thickness, a light-outgoing direction converting/diffusing film having a later-described "a structure in which the step index type and the type having a distribution of refractive indexes which brings out a light-collecting property in the direction of the layer thickness are fused" is obtained.

Both in the step index type shown in FIG. 23 and the type having a distribution of refractive indexes which brings out a light-collecting property in the direction of the layer thickness shown in FIG. 25, the adjacent layers are in contact with each other in the drawing. However, even though the adjacent layers are separated by some extent, they can be treated as those having the adjacent layers in contact with each other. In this case, however, the outgoing direction converting efficiency may be slightly lowered.

In the case in which the optical waveguide array of the step index type and the optical waveguide array of the type having a distribution of refractive indexes which brings out a light-collecting property in the direction of the layer thickness are mixed in the direction of the thickness in the light outgoing direction converting film (FIG. 26-a), or in the case in which the optical waveguide array of the step index type and the optical waveguide array of the type having a distribution of refractive indexes which brings out a light-collecting property in the direction of the layer thickness are mixed in the direction in a film plane or in the planar direction in the light-outgoing direction converting/diffusing film (FIG. 26-b), or in the case of the optical waveguide array having a structure in which both of the types are fused, the incident angle range and the outgoing angle range can be obtained by overlapping the derived results for each type.

[NA Matching with the Optical Engine]

Subsequently, an NA matching between the light-outgoing direction converting film or the light-outgoing direction converting/diffusing film (hereinafter, referred to as the film of the present invention) which constitutes the screen of the present invention and the optical engine will be described.

A screen aperture angle $\theta_S$ is defined as $\theta_S \equiv \theta_{S\text{-}max} - \theta_{S\text{-}min}$ using the minimum aperture angle of screen $\theta_{S\text{-}min}$ and the maximum aperture angle of screen $\theta_{S\text{-}max}$. In order to convert the light-outgoing direction of the projector to the direction of the observer by matching with the NA of the optical engine, $\theta_S$ must be at least $2\theta_2$ in FIG. 22 and FIG. 27. In other words, from the above-described expressions (0-1), (0-2) and (0-3), a condition is represented as follows.

$$\theta_S \geq \tan^{-1}\{(l_2+d/2)/b\} - \tan^{-1}\{(l_2+d/2)/b\} \quad (0\text{-}4)$$

Here, the case of the equal sign corresponds to the matched state. The above-described $\theta_{S\text{-}min}$ and $\theta_{S\text{-}max}$ are respectively equal to the lower limit $\theta_{in\text{-}min}$ and the upper limit $\theta_{in\text{-}max}$ of the incident angle range of the film of the present invention. These values may be obtained by the expressions (1-17) and (1-18) in the case of the step index type, and by (2-39), (2-40) in the case of the gradient index type.

When the optical waveguide array of the step index type and the optical waveguide array of the type having a distribution of refractive indexes which brings out a light-collecting property in the direction of the layer thickness are mixed, preferably, the smaller one of the upper limits of the incident angle ranges of both types is employed as the $\theta_{S\text{-}max}$, and the larger one of the lower limits of the incident angle ranges of both types is employed as the $\theta_{S\text{-}min}$. In other words, assuming that the lower limit and the upper limit of the incident angle range of the optical waveguide of the step index type are $\theta_{STEPin\text{-}min}$ and $\theta_{STEPin\text{-}max}$, and the lower limit and the upper limit of the incident angle range of the optical waveguide of the type having a distribution of refractive indexes which brings out a light-collecting property in the direction of the layer thickness are $\theta_{GRADin\text{-}min}$ and $\theta_{GRADin\text{-}max}$, it is preferable to design the film so as to satisfy the following expression.

$$\text{Min}\{\theta_{STEPin\text{-}max}, \theta_{GRADin\text{-}max}\} - \text{Max}\{\theta_{STEPin\text{-}min}, \theta_{GRADin\text{-}min}\} \geq \tan^{-1}\{(l_2+d/2)/b\} - \tan^{-1}\{(l_2-d/2)/b\} \quad (0\text{-}5)$$

Although the discussion thus far is ideal that utilizes the projector light effectively, at least 50% of the light emitted from the optical engine in the numerical aperture NA must be enter into the screen from the range between $\theta_{min}$ and $\theta_{max}$ in the actual rear projection display as well.

[Method of Manufacturing the Film of the Present Invention]

Subsequently, a method of manufacturing a diffusion film used in the first through third embodiments will be described.

This diffusion film is obtained by irradiating light to a mixture including at least two or more different types of photo-polymerizable monomer or oligomer having different refractive indexes from two different directions for curing the same. The conditions of the irradiation of the light are adequate conditions which satisfy the requirements of the present invention, and the adequate conditions are determined by an experiment.

The photo-polymerizable monomer or oligomer is monomer or oligomer having at least one polymerizable group such as acryloyl group, metaacryloyl group, or vinyl group in a particle. A mixture of a plurality of chemical compounds is applied on the substrate or encapsulated in the cell to obtain a film and cured gradually while irradiating light from two or more directions.

The light to be irradiated may have any wavelength as long as it can cure the compound which includes monomer or oligomer, and visible light beam or ultraviolet beam are often used.

The ultraviolet beam is irradiated by using a mercury lamp or a metal halide lamp or the like. However, when a rod-shaped lamp is used, by adjusting the conditions of irradiation, the obtained sheet like cured substance is caused to have anisotropy between the longer axis and the shorter axis of a light source, so that the light is diffused only when being rotated about the longer axis of the light source.

The lights from two or more directions are used for changing the incident angle of the light with respect to the surface of the sample to be cured for curing. If the difference of the angle of light coming from the adjacent two light sources onto the sample is 50° or larger, the angular range of diffusion of the diffusion film become narrower. Therefore, the angle is preferably within 50°, and more preferably, within 30°.

Subsequently, a method of manufacturing a film having a curved waveguide array structure used in the fourth embodiment of the present invention will be described.

The film is obtained by manufacturing a waveguide structure which is not curved by irradiating light onto a mixture of at least two types of photo-polymerizable monomer or oligomer having different refractive indexes for curing the same, and physically bending the same.

The photo-polymerizable monomer or oligomer is monomer or oligomer having at least one polymerizable group such as acryloyl group, metaacryloyl group, vinyl group in a particle. A mixture of a plurality of chemical compounds is applied on the substrate or encapsulated in the cell to obtain a film and cured gradually while irradiating light.

The light to be irradiated may have any wavelength as long as it can cure the compound which includes monomer or oligomer, and, for example, visible light beam or ultraviolet beam is often used.

The ultraviolet beam is irradiated by using a mercury lamp or a metal halide lamp or the like. However, when a rod-shaped lamp is used, by adjusting the conditions of irradiation, the obtained sheet like cured substance is caused to have anisotropy between the longer axis and the shorter axis of the light source, so that the light can be diffused only when being rotated about the longer axis of a light source.

The film generated in this manner has a structure in which the optical waveguide of the step index type and the optical waveguide of the type having a distribution of refractive indexes which brings out a light-collecting property in the direction of the layer thickness fused with each other.

By soaking the film in an organic solvent to soften and applying a physical force to curve the waveguide structure which has not been curved, the film having a curved waveguide array structure used in the fourth embodiment of the present invention is obtained. The organic solvent may be of any type as long as it can soften the film without impairing the structure of the waveguide of the film.

First Embodiment

Figure 20:
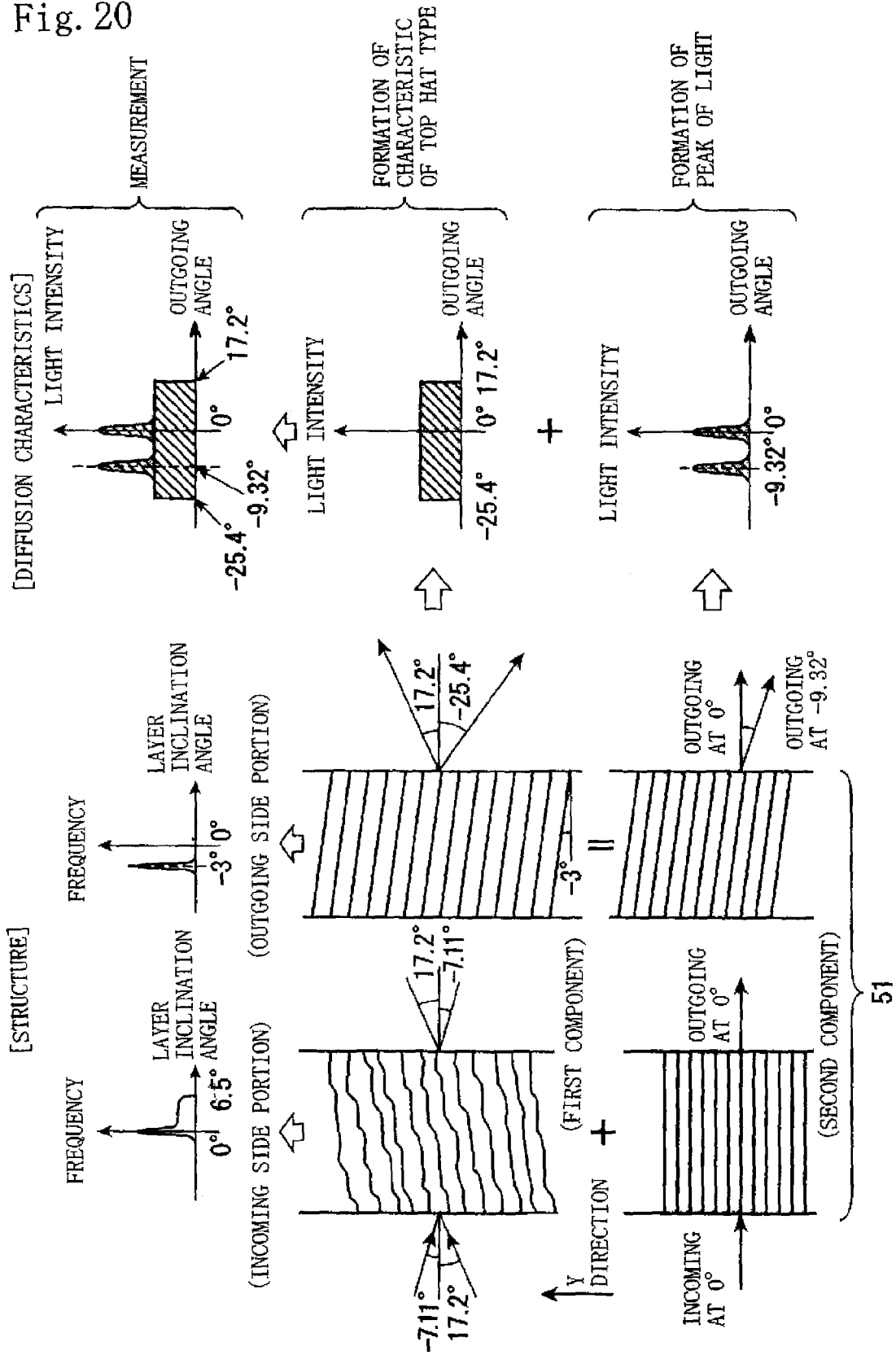
FIG. 20 is an explanatory drawing showing a structure and a diffusion characteristic of the diffusion film used in a first embodiment.

The diffusion film used in a first embodiment corresponds to the film (1), and as shown in FIG. 20, it is divided into the incident side portion and the outgoing side portion in structure. In the incident side portion is formed of layer array which corresponds to the optical waveguide of the step index type, in which the difference between the refractive indexes $n_1$ and $n_2$ of the two types of layers laminated alternately in the y-direction is relatively small, and fluctuations in the layer inclination angle is large. On the other hand, the outgoing side portion is formed of layer array which corresponds to the optical waveguide of the step index type in which the difference between the refractive indexes $n_1$ and $n_2$ of the two types of layers laminated alternately in y-direction is relatively large, there are little fluctuations in the layer inclination angle, and the layer inclination angle is $-3°$ with respect to the normal line to the film. The diffusion film has values $y_{max}=4$ μm and L=300 μm, which satisfies the requirement (L≧10× $y_{max}$).

The refractive indexes of the incident side portion are $n_1=1.5325$, $n_2=1.5275$, and the difference in refractive indexes $\Delta n=n_1-n_2=0.005$. The distribution of the layer inclination angle includes two factors; first components being fluctuated substantially uniformly between 0° and +6.5°, and second components which exist at 0° intensively as an example of the measurements shown in FIG. 13 and summary shown in FIG. 20. A "frequency" of the layer inclination angle in FIG. 13 and FIG. 20 corresponds to the "existential probability" described above. The first components realize the diffusion characteristics of the top hat type, and the second components form a peak of the measurements.

When the values of $\theta_1'$, $\theta_1''$, $\theta_2'$ and $\theta_2''$ are calculated by substituting the values for the parameters in the incident side portion, that is, $\theta+\Delta\theta_{max}=6.5°$, $\theta-\Delta\theta_{max}=0°$, $n_1=1.5325$, $n_2=1.5275$ in the expressions (1) to (4) which express the diffusion characteristics, $\theta_1'=17.2°$, $\theta_1''=7.11°$, $\theta_2'=2.87°$, and $\theta_2''=-7.11°$ are obtained. Therefore, from the expression (5), the angular range of diffusion of the outgoing light $\theta_{out}$ of this incident side portion is; $-7.11°≦\theta_{out}≦17.2°$. Therefore, the light incoming within the range of $-7.11°≦\theta_{in}≦17.2°$ diffused substantially uniformly within the range of $-7.11°≦\theta_{out}≦17.2°$ due to the first components.

Subsequently, this light enters into the layer array of the outgoing side portion. The refractive indexes of the outgoing side portion are $n_1=1.55$, $n_2=1.51$, the difference in refractive index is $\Delta n=n_1-n_2=0.04$, and the layer inclination angle is $-3°$. Therefore, there are little fluctuations.

The light diffused substantially uniformly within the range of $-7.11°≦\theta_{out}≦17.2°$ in the incident side portion is caught by the optical waveguide of the step index type having the value $n_1=1.55$, which constitutes the outgoing side portion, and repeats the multiple reflections. The light assumes a uniformly diffused light of $-4.58°≦\theta_{in}≦11.0°$ within the outgoing side portion, and the layer inclination angle is $-3°$. Therefore, the lights within the angular range of $-4.58°≦\theta_{in}≦-3°$ and $-3≦\theta_{in}≦11.0°$ repeat total reflections symmetrically about $-3°$ as a center. However, the angular range of the light that allows total reflection in the angular range of $-3°≦\theta_{in}≦11.0°$ is the light within the range $-3°≦\theta_{in}≦10.0°$ since $n_1=1.55$, $n_2=1.51$. Therefore, the light is diffused substantially uniformly within the angular range of $-16.0°≦\theta_{in}≦11.0°$ inside the outgoing side portion. When the light within this range goes out into the air layer, the light diffuses substantially uniformly within the angular range of $-25.4°≦\theta_{out}≦17.2°$. This substantially coincides with the measurements.

Subsequently, the peak of the light will be analyzed. Since the peak of frequency exists at the point of 0° in the distribution of the layer inclination angle in the incident side portion, when the light enters at the angle of 0°, this incident angle travels through the incident side portion at the angle of 0° by the influence of the peak. When this traveled light enters into the outgoing side portion, it is totally reflected in the layer at $-3°$. Therefore, this light travels in the direction of $-6°$ when it is reflected by an odd number of times and in the direction of 0° when it is reflected by an even number of times. Consequently lights of 0° and $-6°$ are generated. When these lights go out into the air layer, they travel in the directions of 0° and $-9.32°$, and hence, the peaks are generated at 0° and $-9.32°$ in the measurements.

Second Embodiment

Figure 21:
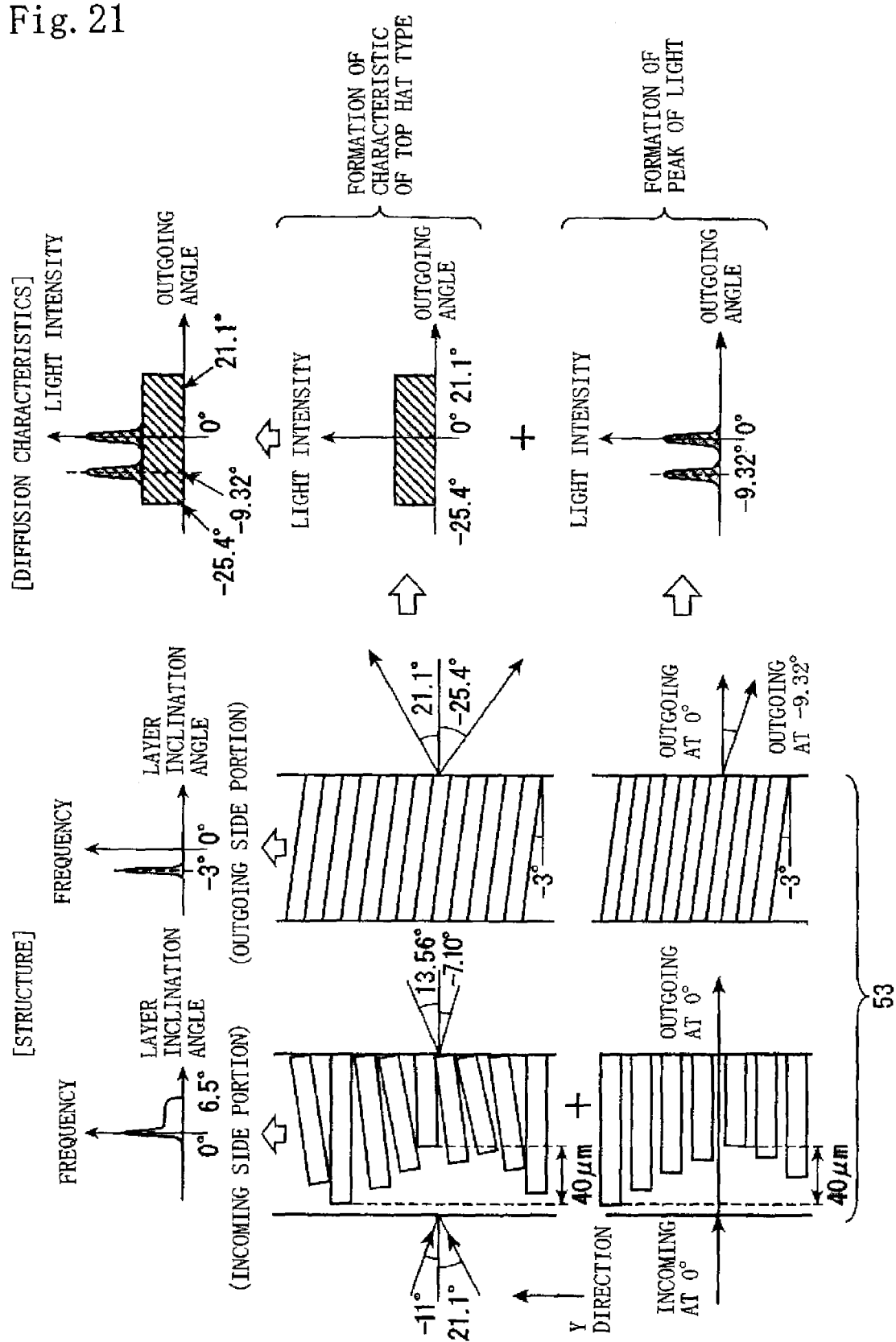
FIG. 21 is an explanatory drawing showing a structure and a diffusion characteristic of the diffusion film used in a second embodiment.

The diffusion film used in the second embodiment corresponds to the film (3) and, as shown in FIG. 21, is divided into the incident side portion and the outgoing side portion in structure. The incident side portion is formed of the layer array of the gradient index type, and the outgoing side portion is formed of the layer array of the step index type. Although this diffusion film is the same as that in the first embodiment by itself, in the second embodiment, the incident side portion of the diffusion film is also applicable to the model of the above-described gradient index type, and the fact that the diffusion characteristics can be described satisfactorily with this model is shown.

Figure 13:
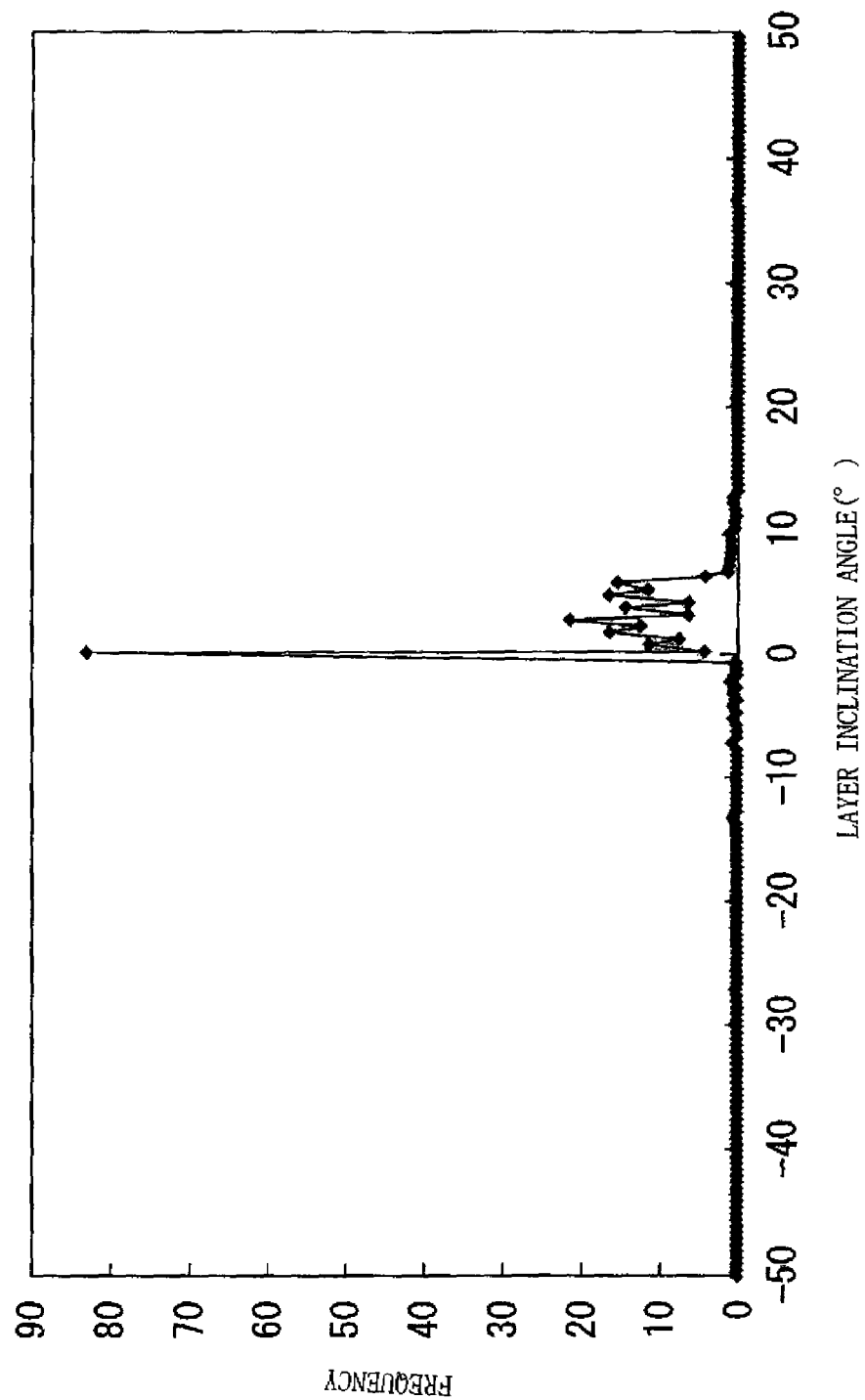
FIG. 13 is a graph showing measurements of the distribution of the layer inclination angle of an incident side portion of the diffusion film used in the present invention.

In the layer array in the incident side portion, the optical axes of the waveguides are fluctuated as shown in a measurement example in FIG. 13. The term "the optical axes are fluctuated" means that angles formed between the optical axes and the normal line of the film plane (corresponds to the angle of layer inclination in FIG. 13) are fluctuated. The refractive index distribution function of within each waveguide is a parabolic distribution function shown by the expression (6), and the parameters are $b_1=2$ μm, $n_1=1.5325$, and $n_2=1.5275$. Therefore, $A=6.525\times10^9$ is obtained from the expression (9), and P/2=38.89 μm is obtained from the expression (8). Since fluctuations of the optical axes are within the range between 0° and 6.5°, the expression (7) may be established when $\theta=0°$, that is, $L_{zmax}=L_{zmin}≧38.89$ μm. In this embodiment, $L_{zmax}-L_{zmin}$ is on the order of 40 μm as shown in FIG. 21, the incident light can be diffused uniformly. Although the optical axes are fluctuated in the range between 0° and 6.5° in the diffusion film in this embodiment, the waveguides which determine the edge portion of having the diffusion characteristics of the top hat type are the waveguides at 0° and 6.5°, and hence the analysis will be made for 0° and 6.5°.

The wave guide at 6.5° will be analyzed first. In the waveguide, the light meandering within the range obtained by the expression (15). Therefore, the angle of diffusion by this waveguide is from $-0.557°$ to 13.56°. When it is assumed that $n_1=n_g$ is established, this diffuse light enters into the layer array of the step index type which constitutes the outgoing side portion. The parameters on the outgoing side are: $n_1=1.55$, $n_2=1.51$, and the difference of refractive index $\Delta n=n_1-n_2=0.04$, and the layer inclination angle is $-0.3°$. Therefore, there are little fluctuations.

The light which is uniformly diffused within the range between $-0.557°$ and 13.56° in the incident side portion is caught by the optical waveguide of the step index type of $n_1=1.55$ on the outgoing side portion, and repeats the multiple reflections. Within the outgoing side portion, the light is converted into the uniform diffuse light in the range between $-0.551°$ and 13.4°, and the layer inclination angle is $-3°$. Therefore, the light repeats the total reflections symmetrically about $-3°$ as a center. However, the angular range of the light that allows total reflection in the angular range between $-0.551°$ and 13.4° is only the angular range between $-0.551°$ and 10° since $n_1=1.55$, and $n_2=1.51$. Therefore, the light is diffused within the angular ranges between $-16.0°$ and $-5.45°$, and $-0.551°$ and 13.4° uniformly inside the portion of the outgoing side. Although there is no light in the range between $-5.45°$ and $-0.551°$, since the optical waveguides of the gradient index type of 0° to 6.5° fill therein, the light is diffused uniformly within the angular range between −16° and 13.4°. When this light is emitted to the air layer, the light is diffused within the angular range between −25.4° and 21.1° uniformly.

When the case in which the waveguide of the gradient index type in the incident side portion is 0° is analyzed in the same manner, the light emitted from the outgoing side portion diffuses uniformly within the angular range between −20.4° and 10.9°. Therefore, the light is diffused uniformly in the angular range between −25.4° and 21.1° with the lamination model including the incident side portion composed of the layer array of the optical waveguides of the gradient index type whose optical axes are fluctuated in the range between 0° and 6.5° and the outgoing side portion composed of the layer array of the optical waveguides of the step index type which are included in the range between −25.4° to and 21.1°.

Subsequently, the peak of the light will be analyzed. Since the peak of frequency exists at the point of 0° in the fluctuation distribution of the optical axes of the waveguides in the incident side portion, if there is a gap between the waveguides at 0°, part of light may go through. When the incident angle is 0°, this light passes through as is to the outgoing side portion. Since the layers on the outgoing side portion are inclined by −3°, the light is totally reflected on the layer of −3°, and if it is reflected by the odd number of times, it travels to the direction of −6°, and when it is reflected by the even number of times, it travels to the direction of 0°, and hence the light of 0° and the light of −6° are generated. When these lights go out to the air layer, it travels to the direction of 0° and −9.32°, and hence the peaks are generated at 0° and −9.32° in the measurement.

Third Embodiment

Figure 41:
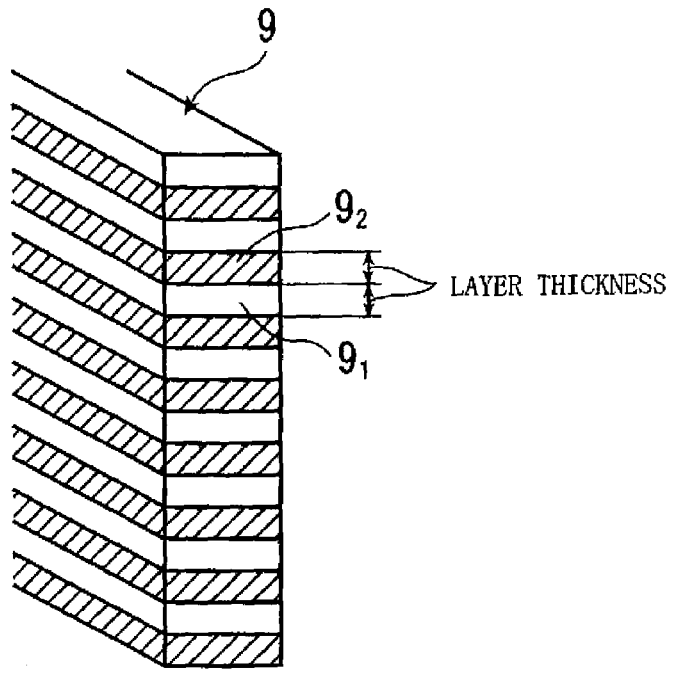
FIG. 41 is an explanatory drawing showing (a) a general outline of the optical film used in a third embodiment and (b) a summary of experiment for converting an outgoing direction using the bent waveguide manufactured from the optical film.
Figure 41:
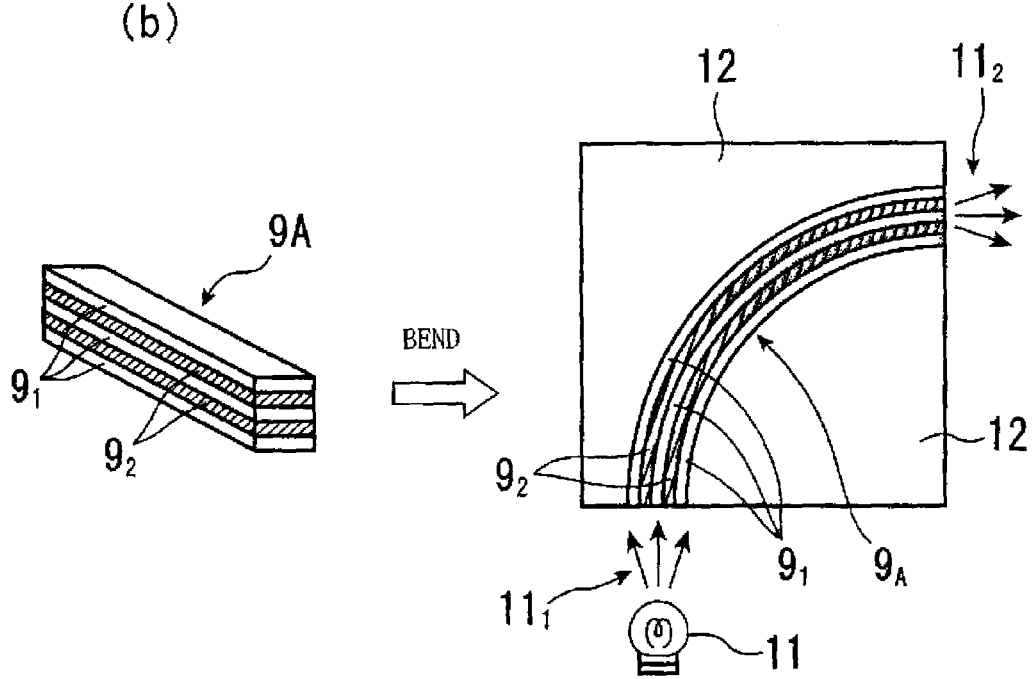

In a third embodiment, as shown in FIG. 41 (*a*), a structure which is optically equivalent to the curved waveguide structure of the light-outgoing direction converting/diffusing film used in the present invention is obtained by arranging an optical film strip 9A obtained from an optical film 9 having a structure in which layers $9_1$ and layers $9_2$ are arranged in piles alternately in the direction of the planer having different refractive indexes in a bent manner as shown in FIG. 41(*b*). The thickness of each layer is 2 μm. The respective layer has a structure including the optical waveguide of the step index type in which the radius of curvature of the layer interface is locally varied and the optical waveguide of the gradient index type in which the length of the layer is varied fused with each other, and the refractive index at the center of the layer thickness is 1.55 in the layer $9_1$ and is 1.51 in the layer $9_2$. In order to prevent total reflection on the air interface, as shown in FIG. 41(*b*), the periphery of the bent optical film strip 9A is filled with transparent medium 12 having refractive index of 1.6. The radius of curvature is 4 cm for the minimum layer, which is sufficiently larger than either of the $R_{minstep}$ of the expression (1-16) and the $R'_{min}$ of the expression (2-32).

An experiment to cause light (incident light $11_1$) to be entered into the optical film strip 9A arranged in a curved state as described above from the side of one end surface using a light source 11 is conducted, and the fact that the light goes out from the side of the other end surface as an outgoing light $11_2$ is confirmed. The intensity of the outgoing light $11_2$ is substantially the same as the intensity of the incoming light $11_1$.

Fourth Embodiment

In a fourth embodiment, a detailed example of a design in which the NA matching between the light-outgoing direction converting film and the optical engine is performed in the case in which the screen (the light-outgoing direction converting film of the step index type+diffusing film) is applied to the actual thin-type rear projection display system shown in FIG. 33.

The optical system deployed with the mirrors M1, M3 and the non-spherical mirror M2 of the actual system removed is as shown in FIG. 27.

In the actual system, as shown in FIG. 33, the light changes the direction three times by the mirrors M1, M3 and the non-spherical mirror M2 on the backside of the screen 10, and the output light from the optical engine 20 is bent traversely by the mirror M1 which is located immediately in front toward the side. Assuming that the depth of the actual system (a distance between the surfaces of the mirror M3 and the screen 10) is 20 cm, the height of the screen 10 is 1 m, and the distance between the centers of the lens and the mirror M1 is 40 cm, b=20 cm×3+40 cm=1 m, $S_2$=1 m in the deployed optical system in FIG. 27. Assuming that the vertical length of an image display panel 21 (=$S_1$ in FIG. 27) including the DMD chip is 2.5 cm, a=2.5 cm from the magnification $S_2/S_1$=1 m/2.5 cm=40=b/a=1 m/a, and the focal distance f of the lens is f=2.44 cm from 1/a+1/b=1/f. A lens diameter d is 2.4 cm. When $l_1$=30 cm, $l_2$=$l_1$+$S_2$=130 cm.

Since a parameter of the optical system is now determined, from the expressions (0-2) and (0-3), $\theta_1$ and $\theta_0$ in FIG. 27 is $\theta_1$=52.474° and $\theta_0$=16.066°. The range of the angle $\theta_{opt}$ which determines the output NA of the optical system is between $\theta_0$ and $\theta_1$ inclusive. When this range matches the range of the incoming angle of the light-outgoing direction converting film, the NA matching is achieved.

Since the range of the input angle of the light-outgoing direction converting film of the step index type is between $\theta_{in4}$ and $\theta_{in5}$ inclusive from the expression (1-12), the conditions of achievement of the NA matching is $\theta_{in4}$=$\theta_0$=16.066°, $\theta_{in5}$=$\theta_1$=52.474°.

Subsequently, $\theta_{bend}$ (corresponds to $\theta_{bend-in}$) will be calculated. $\theta_{bend}$ is calculated by the following expression which is derived from an expression derived by substituting +$\theta_{in4}$ for −$\theta_{in4}$ in the expression (1-9), and the expression (1-11).

$$\theta_{bend}=\tfrac{1}{2}\times[\sin^{-1}(n_{air}/n_g\times\sin\theta_{in4})+\sin^{-1}(n_{air}/n_g\times\sin\theta_{in5})] \quad (1\text{-}21)$$

When calculating by substituting the respective values described above for $\theta_{in4}$ and $\theta_{in5}$, and assuming $n_g$=1.5 and $n_{air}$=1.0, $\theta_{bend}$=21.275° is obtained.

Subsequently, the radius of curvature of the bent waveguide is calculated. In this calculation, $r_0$ is calculated by entering the values of $\theta_{in5}$, $\theta_{bend}$, $n_g$, $n_{air}$, $n_1$, $n_2$, $y_1$ (width of the optical waveguide=layer thickness) in the following expression:

$$\sin[\cos^{-1}\{n_g/n_1\times\sin(\sin^{-1}(n_{air}/n_g\times\sin\theta_{in5})-\theta_{bend})\}]=n_2/n_1\times(1+y_1/r_0) \quad (1\text{-}11B)$$

which is obtained by modifying the expression (1-11), and, from R=$r_0$+$y_1$/2, the radius of curvature is obtained. When the $r_0$ is obtained assuming that the $\theta_{in5}$, $\theta_{bend}$, $n_g$, $n_{air}$ are the above-described respective values, and that $n_1$=1.55, $n_2$=1.51, $y_1$=4 μm, $r_0$=401.617 μm is obtained. Therefore, the radius of curvature is represented by R=$r_0$+$y_1$/2=403.617 μm.

Figure 42:
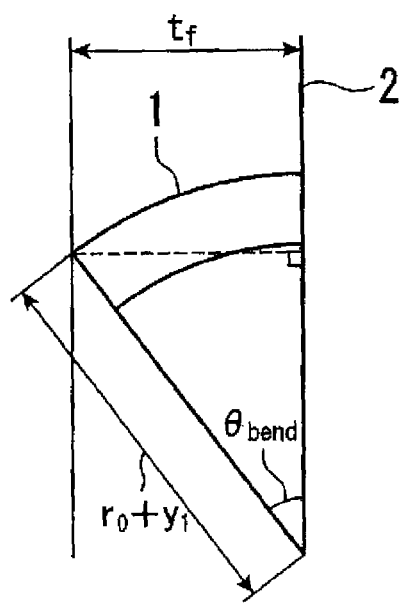
FIG. 42 is an explanatory drawing showing a method of calculating the thickness of the film.

When $\theta_{bend}$ is used, since the thickness $t_f$ of the film is ($r_0$+$y_1$)×sin $\theta_{bend}$ from FIG. 42, and hence the expression $t_f$=($r_0$+$y_1$)×sin $\theta_{bend}$=147.2 μm is established.

On the other hand, since the NA on the outgoing side is determined by the expression (1-5), when the $r_0$ and other parameters obtained above are substituted into the expression (1-5), $\theta_{out2}$=16.084° is obtained. Therefore, from the expression (1-6), the angular range that determines the NA on the output side becomes $-16.084° \leq \theta_{NAstep} \leq +16.084°$.

Fifth Embodiment

In a fifth embodiment, a detailed example of a design in which the NA matching between the light-outgoing direction converting film and the optical engine is performed in a case in which the screen (gradient index type light-outgoing direction converting film+diffusing film) is applied to the thin-type rear projection display system which is the same as in the fourth embodiment will be described.

The range of the angle $\theta_{opt}$ which determines the output NA of the optical system is between $\theta_0(=16.066°)$ and $\theta_1$ ($=52.474°$) inclusive as in the case of the forth embodiment. When this range matches the input angular range of the light-outgoing direction converting film, the NA matching is achieved.

The input angular range of the light-outgoing direction converting film of the gradient index type is, from the expression (2-16A), between $\theta_{in1}$ and $\theta_{in2}$ inclusive. Therefore, the conditions of achievement of the NA matching is $\theta_{in2}=\theta_0=16.066°$, $\theta_{in1}=\theta_1=52.474°$.

Subsequently, $\theta_{bend}$ (corresponds to $\theta_{bend-in}$) is calculated. $\theta_{bend}$ is calculated by the following expression which is obtained by modifying the expression (2-12A).

$$\theta_{bend}=\sin^{-1}(n_{air}/n_g \times \sin \theta_{in1}) - \sin^{-1}(n_1/n_g \times \sin \theta_{NA0}) \quad (2\text{-}12B)$$

Here, $\theta_{NA0}$ is calculated by the expression (2-5): $\theta_{NA0}=\tan^{-1}(n_1 \times \sqrt{A} \times y_1/2)$, and the A in the expression (2-5) is calculated by the expression (2-2): $A=(8/y_1^2)\times(n_1-n_2)/n_1$.

When 4 µm is substituted for $y_1$, 1.55 is substituted for $n_1$, and 1.51 is substituted for $n_2$ in the expression (2-2), $A=1.290\times10^{10}$ is established. When the value A and the above-described $y_1$, $n_1$ values are substituted into the expression (2-5), $\theta_{NA0}=19.397°$ is established. Therefore, the value of $\theta_{NA0}$, the $\theta_{in1}$, the value of $n_1$, $n_g=1.5$, $n_{air}=1.0$ are substituted into the expression (2-12B), so that θbend=11.848° is determined.

Subsequently, the value n is determined. The value n is calculated using the following expression obtained by modifying the expression (2-15A).

$$n=\theta_{NA0}/[\theta_{NA0}-\sin^{-1}\{n_g/n_1\times\sin\{\theta_{bend}-\sin^{-1}(n_{air}/n_g\times\sin\theta_{in2})\}\}] \quad (2\text{-}15B)$$

The respective values corresponding to the parameters in the expression is substituted into the expression (2-15B), so that n=1.0646 is determined.

Then, the radius of curvature of the bent waveguide is calculated. In this calculation, the value A is substituted into the expression (2-4): $P=2\times\pi/\sqrt{A}$ to obtain P=55.32 µm, and then the value P, the value of $\theta_{NA0}$, and the value n are substituted into the expression (2-30): $R=r_0+y_1/2=(P/4)/\tan(\theta_{NA0}/(2\times n))$, so that the radius of curvature R=86.247 µm is determined.

From FIG. 42, since the thickness $t_f$ of the film is $(r_0+y_1)\times\sin\theta_{bend}$, when using $\theta_{bend}$, $t_f=(r_0+y_1)\times\sin\theta_{bend}$=18.1185 µm (when $\theta_{bend-out}=0°$).

On the other hand, the NA on the output side is designed by the output symmetry on the upper and lower sides. The angle of the optical axis on the output side $\theta_{axis}$ ($=\theta_{bend-out}$) is obtained by substituting the respective values corresponding to the parameters in the expression (2-26), which is $\theta_{axis}$ ($=\theta_{bend-out}$)=9.4273°. Therefore, from the expression (2-27), $\theta'_{out3}=\theta'_{out4}=16.084°$. Therefore, from the expression (2-28), the range of the angle which determines the output NA which is symmetry on the upper and lower side of the light-outgoing direction converting film is $-16.084° \leq \theta_{NAout} \leq 16.084°$.

INDUSTRIAL APPLICABILITY

The present invention can be used for designing and manufacturing the rear (or front) projection display screen.

The invention claimed is:

1. A projection display screen having a diffusion film for diffusing light incoming from an angular range of diffusion of an incident light into an angular range of diffusion of an outgoing light, wherein the diffusion film comprises a structure in which a plurality of layers, each of said plurality of layers has a different refractive index from adjacent layers, and an interface between the adjacent layers is substantially in a wavy shape, said plurality of layers constitute a plurality of step index optical waveguides that form stripes arranged in a banded state in a direction in a film plane and that extend in a direction of a layer inclination angle which is distributed substantially in a top hat shape within a predetermined angular range with respect to a direction of film thickness.

2. A projection display screen having a diffusion film for diffusing light incoming from an angular range of diffusion of an incident light into an angular range of diffusion of an outgoing light, wherein the diffusion film comprises a structure in which a portion having a structure (A1) which is the same as the structure of the diffusion film according to claim 1 and a portion having a structure (B1) in which a plurality of layers constituting optical wave guides having a refractive index distribution that brings out a light collecting property in the direction of the layer thickness extends in the direction of the film thickness or in the direction inclined from this direction with a layer length distributed within a predetermined range substantially in the top hat shape in a portion in the direction of the film thickness, are mixed in the direction of the film thickness or in the direction in the film plane, or, a structure in which the structure (A1) and the structure (B1) are fused with each other.

3. A projection display screen having a diffusion film for diffusing light incoming from an angular range of diffusion of an incident light into an angular range of diffusion of an outgoing light, wherein the diffusion film comprises a structure in which a plurality of layers, each of said plurality of layers has a different refractive index from adjacent layers, and an interface between the adjacent layers is substantially in a wavy shape, said plurality of layers constitute a plurality of step index optical waveguides that form stripes arranged in a banded state in a direction in a film plane, one or more peaks are included within a predetermined angular range with respect to a direction of film thickness, and the plurality of layers extends in a direction of a layer inclination angle which is distributed substantially in a top hat shape excepting said peaks within the predetermined angular range.

4. A projection display screen having a diffusion film for diffusing light incoming from an angular range of diffusion of an incident light into an angular range of diffusion of an outgoing light, wherein the diffusion film comprises a structure in which a portion having a structure (A2) which is the same as the structure of the diffusion film according to claim 3 and a portion having a structure (B1) in which a plurality of layers constituting optical wave guides having a refractive index distribution that brings out a light collecting property in the direction of the layer thickness extends in the direction of the film thickness or in the direction inclined from this direction with a layer length distributed within a predetermined range substantially in the top hat shape in a portion in the direction of the film thickness, are mixed in the direction of the film thickness or in the direction in the film plane, or, a structure in which the structure (A2) and the structure (B1) are fused with each other.

5. A projection display screen having a diffusion film for diffusing light incoming from an angular range of diffusion of an incident light into an angular range of diffusion of an outgoing light, wherein the diffusion film comprises a structure in which a plurality of layers constituting optical wave guides having a gradient refractive index distribution in one layer that brings out a light collecting property in the direction of the layer thickness extends in a direction of film thickness or in the direction inclined from this direction with a layer length distributed within a predetermined range substantially in a top hat shape in a portion in the direction of the film thickness.

6. A screen using a film having a function of converting a light-outgoing direction comprising a diffusion film for diffusing light incoming from an angular range of diffusion of the incident light into an angular range of diffusion of an outgoing light; and a light-outgoing direction converting film for causing light incoming from an oblique direction to go out toward the front, wherein the light-outgoing direction converting film comprises a structure in which a plurality of layers, each of which has a curved shape and has a different reflective index from the adjacent layers, forming a plurality of step index type optical waveguides is arranged in a banded state in the direction in a film plane, and extends so as to be bent with respect to a direction of film thickness.

7. A screen using a film having a function of converting a light-outgoing direction comprising a diffusion film for diffusing light incoming from an angular range of diffusion of the incident light into an angular range of diffusion of an outgoing light; and a light-outgoing direction converting film for causing light incoming from an oblique direction to go out toward the front, wherein the light-outgoing direction converting film comprises a structure in which the structure according to claim 6 and a structure in which the plurality of layers forming optical waveguides having a curved shape and having a gradient refractive index distribution in one layer, which brings out a light-collecting property in the direction of the layer thickness is arranged in a banded state in the direction in a film plane, and extend so as to be bent with respect to the direction of the film thickness are mixed in one or both of the film thickness direction and in the direction in the film plane.

8. An optical system for projection display system comprising a screen using a film having a function of converting a light-outgoing direction according to claim 7; a projector which emits an incident light to the screen, wherein a projector aperture and arrangement of the projector matches an angular range of incidence of the screen.

9. The screen using a film having a function of converting a light-outgoing direction according to claim 7, wherein the angular range of diffusion of the incident light of the diffusing film matches the outgoing angular range of the light-outgoing direction converting film.

10. The screen using a film having a function of converting a light-outgoing direction according to claim 6, wherein the angular range of diffusion of the incident light of the diffusing film matches the outgoing angular range of the light-outgoing direction converting film.

11. The optical system for projection display system comprising a screen using a film having a function of converting a light-outgoing direction according to claim 10; a projector which emits an incident light to the screen, wherein a projector aperture and arrangement of the projector matches an angular range of incidence of the screen.

12. An optical system for projection display system comprising a screen using a film having a function of converting a light-outgoing direction according to claim 6; a projector which emits an incident light to the screen, wherein a projector aperture and arrangement of the projector matches an angular range of incidence of the screen.

13. A screen using a film having a function of converting a light-outgoing direction comprising a diffusion film for diffusing light incoming from an angular range of diffusion of the incident light into an angular range of diffusion of an outgoing light; and a light-outgoing direction converting film for causing light incoming from an oblique direction to go out toward the front, wherein the light-outgoing direction converting film comprises a structure in which a plurality of layers forming optical waveguides having a curved shape and having a gradient refractive index distribution in one layer, which brings out a light-collecting property in the direction of the layer thickness is arranged in a banded state in the direction in a film plane, and extend so as to be bent with respect to the direction of film thickness.

14. The screen using a film having a function of converting a light-outgoing direction according to claim 13, wherein the angular range of diffusion of the incident light of the diffusing film matches the outgoing angular range of the light-outgoing direction converting film.

15. An optical system for projection display system comprising a screen using a film having a function of converting a light-outgoing direction according to claim 13; a projector which emits an incident light to the screen, wherein a projector aperture and arrangement of the projector matches an angular range of incidence of the screen.

16. A screen having a light outgoing direction converting/diffusing film that causes incident light from an oblique direction to diffuse and go out toward the front direction, wherein the light-outgoing direction converting/diffusing film comprises a structure in which a plurality of layers, each of plurality of layers has different refractive index from adjacent layers, each of said plurality of layers has a curved shape and an interface of the adjacent layers is substantially in a wavy shape, and forming a plurality of step index type optical waveguides is arranged in a banded state in the direction in a film plane, and extends so as to be bent with respect to the direction of the film thickness, and layer inclination angles which are distributed substantially in a top hat shape.

17. The screen having a light outgoing direction converting/diffusing film that causes incident light from an oblique direction to diffuse and go out toward the front direction, wherein the light-outgoing direction converting/diffusing film comprises a structure (A) in which the structure according to claim 16 and a structure (B) in which the plurality of layers forming optical waveguides having a curved shape and having a gradient refractive index distribution in one layer, which brings out a light collecting property in the direction of the layer thickness is arranged in a banded state in the direction in a film plane, and extends so as to be bent with respect to the direction of the film thickness, and the length of the layers are distributed substantially in a top hat shape are mixed in one or both of the film thickness direction and in the direction of the film plane, or the structure (A) and the structure (B) are fused with each other.

18. An optical system for projection display system comprising a screen using a film having a function of converting a light-outgoing direction according to claim 17; a projector which emits an incident light to the screen, wherein a projector aperture and arrangement of the projector matches an angular range of incidence of the screen.

19. An optical system for projection display system comprising a screen using a film having a function of converting a light-outgoing direction according to claim 16; a projector which emits an incident light to the screen, wherein a projector aperture and arrangement of the projector matches an angular range of incidence of the screen.

20. A screen having a light-outgoing direction converting/diffusing film that causes incident light from an oblique direction to diffuse and go out toward the front direction, wherein the light-outgoing direction converting/diffusing film comprises a structure in which a plurality of layers forming optical waveguides having a curved shape and having a gradient refractive index distribution in one layer, which brings out a light-collecting property in a direction of layer thickness is arranged in a banded state in the direction in a film plane, and extends so as to be bent with respect to a direction of film thickness, and a length of the layers are distributed substantially in a top hat shape.

21. An optical system for projection display system comprising a screen using a film having a function of converting a light-outgoing direction according to claim 20; a projector which emits an incident light to the screen, wherein a projector aperture and arrangement of the projector matches an angular range of incidence of the screen.

* * * * *